US012634350B2

(12) United States Patent
Prica et al.

(10) Patent No.: US 12,634,350 B2
(45) Date of Patent: May 19, 2026

(54) SYSTEM AND METHOD FOR ENFORCING SERVICE CONTROL POLICIES FOR SERVICES AND SERVICE FEATURES

(71) Applicant: ORACLE INTERNATIONAL CORPORATION, Redwood Shores, CA (US)

(72) Inventors: Mihai Prica, Redmond, WA (US); Richard Stockton, Minneapolis, MN (US); Prabhjot Singh, Monroe, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 71 days.

(21) Appl. No.: 18/639,811

(22) Filed: Apr. 18, 2024

(65) Prior Publication Data

US 2024/0364746 A1 Oct. 31, 2024

Related U.S. Application Data

(60) Provisional application No. 63/462,868, filed on Apr. 28, 2023.

(51) Int. Cl.
*H04L 9/40* (2022.01)
*G06F 11/362* (2025.01)

(52) U.S. Cl.
CPC ............ *H04L 63/20* (2013.01); *G06F 11/362* (2013.01)

(58) Field of Classification Search
CPC ............................... H04L 63/20; G06F 11/362
(Continued)

(56) References Cited

U.S. PATENT DOCUMENTS 8,113,959 B2 2/2012 De Judicibus
8,161,173 B1 4/2012 Mishra et al.
(Continued)

FOREIGN PATENT DOCUMENTS

CA 2804864 C 11/2018
CA 3159014 A1 6/2021
(Continued)

OTHER PUBLICATIONS

"Cloud External Key Manager," Retrieved from https://cloud.google.com/kms/docs/ekm, Mar. 4, 2024, pp. 5.
(Continued)

*Primary Examiner* — Anthony D Brown
(74) *Attorney, Agent, or Firm* — Invoke

(57) ABSTRACT

Embodiments described herein are generally related to systems and methods for providing cloud environments, for use by tenants of a cloud infrastructure environment in accessing software products, services, or other offerings associated with the environment, including methods for defining and enforcing service control policies directed to services and service features. In accordance with an embodiment, the system comprises a service control repository or service catalog that provides a definition of the services and service features, together with service control policies or rules that define availability or access to the service features. A service control policy framework, comprising a feature management service, determines, by reference to a hierarchy of entities defining the service control policies, which different entities can control the availability of particular services or service features to end users.

37 Claims, 23 Drawing Sheets

(58) Field of Classification Search
USPC .............................................................. 726/1
See application file for complete search history.

(56) References Cited

U.S. PATENT DOCUMENTS 8,214,398 B1 7/2012 Cowan et al.
8,898,763 B1 11/2014 Mannepalli et al.
9,092,502 B1 7/2015 Cannaliato et al.
9,306,814 B1 4/2016 Roth et al.
9,438,599 B1 9/2016 Yuhan et al.
9,569,630 B2 2/2017 Cabrera et al.
9,722,895 B1 8/2017 Sarukkai et al.
9,876,703 B1 1/2018 Arllen et al.
9,985,947 B1 5/2018 Elhard
10,021,084 B2 7/2018 Matthews et al.
10,061,932 B1 8/2018 Combs et al.
10,089,476 B1 10/2018 Roth et al.
10,122,717 B1 11/2018 Reddy et al.
10,261,782 B2 4/2019 Suarez et al.
10,270,759 B1 4/2019 Bordelon et al.
10,318,265 B1 6/2019 To et al.
10,496,306 B1 12/2019 Srivastava et al.
10,503,917 B2 12/2019 Roth et al.
10,511,675 B1 12/2019 Chud
10,528,995 B2 1/2020 Maes
10,554,418 B2 2/2020 Kshirsagar et al.
10,567,360 B2 2/2020 Nirwal et al.
10,757,574 B1 8/2020 Rule et al.
10,834,100 B2 11/2020 Hoy et al.
10,878,483 B1 12/2020 Felbinger et al.
10,956,600 B2 3/2021 Ye et al.
10,972,445 B2 4/2021 Tucker et al.
10,974,516 B2 4/2021 Moriya
11,121,985 B2 9/2021 Cidon et al.
11,240,110 B1 2/2022 Narula et al.
11,252,157 B1 2/2022 Khanna et al.
11,321,137 B2 5/2022 Barsalou et al.
11,323,477 B1 5/2022 Kumar et al.
11,356,273 B1 6/2022 Patel et al.
11,379,353 B1 7/2022 Marchetti et al.
11,444,925 B1 9/2022 Patimer et al.
11,537,745 B2 12/2022 Yang et al.
11,552,953 B1 1/2023 Avadhanam
11,574,151 B2 2/2023 Wang et al.
11,575,508 B2 2/2023 Anand et al.
11,587,458 B2 2/2023 Lowensohn
11,593,251 B2 2/2023 Chirkin et al.
11,604,672 B2 3/2023 Subramanian et al.
11,611,558 B2 3/2023 Lee et al.
11,652,616 B2 5/2023 Zee et al.
11,689,475 B2 6/2023 Goyal
11,720,536 B1 8/2023 Kisser et al.
11,727,464 B2 8/2023 Eisenstein et al.
11,853,753 B1 12/2023 Chawda et al.
11,936,678 B2 3/2024 Pieczul et al.
11,954,238 B1 4/2024 Tan et al.
12,021,888 B1 6/2024 Reed et al.
12,067,493 B2 8/2024 Zhang et al.
12,143,917 B2 11/2024 Raffa et al.
12,164,652 B1 12/2024 Li et al.
12,363,148 B1 7/2025 Anil et al.
12,412,103 B1 9/2025 Chen et al.
12,445,419 B2 10/2025 Adogla et al.
12,457,204 B2 10/2025 Adogla et al.
2002/0026592 A1 2/2002 Gavrila et al.
2002/0198973 A1 12/2002 Besaw
2003/0154407 A1 8/2003 Kato et al.
2005/0198331 A1 9/2005 Okajima et al.
2006/0230281 A1 10/2006 Hofmann
2007/0124374 A1 5/2007 Arun et al.
2007/0179859 A1 8/2007 Chan et al.
2009/0164499 A1 6/2009 Samudrala et al.
2009/0165078 A1 6/2009 Samudrala et al.
2009/0205018 A1 8/2009 Ferraiolo et al.
2010/0106678 A1 4/2010 Pietrek et al.
2010/0131624 A1 5/2010 Ferris
2010/0153865 A1 6/2010 Barnes et al.
2010/0212004 A1 8/2010 Fu
2011/0167435 A1 7/2011 Fang
2011/0277017 A1 11/2011 Ivanov et al.
2012/0117462 A1 5/2012 Jacobson et al.
2012/0131162 A1 5/2012 Brandt et al.
2013/0054426 A1 2/2013 Rowland et al.
2013/0111027 A1 5/2013 Milojicic et al.
2013/0111609 A1 5/2013 Resch et al.
2013/0226699 A1 8/2013 Long
2013/0232463 A1 9/2013 Nagaraja et al.
2013/0232480 A1 9/2013 Winterfeldt et al.
2013/0276142 A1 10/2013 Peddada
2013/0282540 A1 10/2013 Bliesner
2013/0282798 A1 10/2013 Mccarthy et al.
2013/0297711 A1 11/2013 Nhu
2013/0304925 A1 11/2013 Ferris et al.
2014/0007041 A1 1/2014 Schmeling et al.
2014/0075565 A1 3/2014 Srinivasan et al.
2014/0095546 A1 4/2014 Kruglikov et al.
2014/0188938 A1 7/2014 Banks et al.
2014/0215590 A1 7/2014 Brand
2014/0236745 A1 8/2014 Vautour
2014/0280595 A1 9/2014 Mani et al.
2014/0280948 A1 9/2014 Schmidt et al.
2015/0089575 A1 3/2015 Vepa et al.
2015/0106736 A1 4/2015 Torman et al.
2015/0200966 A1 7/2015 Kasturirangan et al.
2015/0312268 A1 10/2015 Ray
2015/0358161 A1 12/2015 Kancharla et al.
2015/0363852 A1 12/2015 Vautour
2015/0372938 A1 12/2015 Patel et al.
2016/0028833 A1 1/2016 Georgieva
2016/0043909 A1 2/2016 Pogrebinsky et al.
2016/0110553 A1 4/2016 Factor et al.
2016/0125489 A1 5/2016 Gupte et al.
2016/0132806 A1 5/2016 To et al.
2016/0139737 A1 5/2016 Conn et al.
2016/0142211 A1 5/2016 Metke et al.
2016/0203544 A1 7/2016 Smits et al.
2016/0277411 A1 9/2016 Dani et al.
2016/0294881 A1 10/2016 Hua et al.
2016/0323183 A1 11/2016 Jeuk et al.
2016/0337365 A1 11/2016 Beiter
2017/0006119 A1 1/2017 Pogrebinsky et al.
2017/0069011 A1 3/2017 Akkiraju et al.
2017/0111331 A1 4/2017 Auradkar et al.
2017/0111446 A1 4/2017 Rivera et al.
2017/0116334 A1 4/2017 Kruglikov et al.
2017/0149564 A1 5/2017 Mccallum
2017/0201525 A1 7/2017 Biller et al.
2017/0230229 A1 8/2017 Sasturkar et al.
2017/0323112 A1 11/2017 Tran et al.
2017/0373860 A1 12/2017 Kshirsagar et al.
2018/0025399 A1 1/2018 Nedeltchev et al.
2018/0025403 A1 1/2018 Mckay et al.
2018/0052861 A1 2/2018 Seetharaman et al.
2018/0137261 A1 5/2018 Lattin et al.
2018/0176023 A1 6/2018 Prickett et al.
2018/0191718 A1 7/2018 Kuzkin et al.
2018/0197161 A1 7/2018 Kuzkin et al.
2018/0211236 A1* 7/2018 Rutherford ......... H04L 63/0428
2018/0212778 A1 7/2018 Novak
2018/0219784 A1 8/2018 Jiang et al.
2018/0232786 A1 8/2018 Kuzkin et al.
2018/0234256 A1 8/2018 Bowen
2018/0288063 A1 10/2018 Koottayi et al.
2018/0356964 A1 12/2018 Morris
2018/0367542 A1 12/2018 Wolf et al.
2018/0373521 A1 12/2018 Huang et al.
2019/0020659 A1 1/2019 Loni et al.
2019/0068495 A1 2/2019 Jeuk et al.
2019/0087835 A1 3/2019 Schwed et al.
2019/0104035 A1 4/2019 Cidon et al.
2019/0114335 A1 4/2019 Koenig et al.
2019/0132299 A1 5/2019 Tucker et al.
2019/0149417 A1 5/2019 Augusto et al.
2019/0156000 A1 5/2019 Hoffmann et al.

(56) References Cited

U.S. PATENT DOCUMENTS

2019/0166007 A1 5/2019 Sundaram et al.
2019/0182153 A1 6/2019 Gundavelli et al.
2019/0190917 A1 6/2019 Joe
2019/0205045 A1 7/2019 Hugot et al.
2019/0273796 A1 9/2019 Allgeier et al.
2019/0332789 A1 10/2019 Vandenbrouck et al.
2019/0334917 A1 10/2019 Demmler et al.
2019/0354692 A1 11/2019 Thoram et al.
2019/0362087 A1 11/2019 Ferrans et al.
2020/0004569 A1 1/2020 Gupta et al.
2020/0014659 A1 1/2020 Chasman et al.
2020/0042675 A1 2/2020 Asanghanwa et al.
2020/0097315 A1 3/2020 Faynberg et al.
2020/0112497 A1 4/2020 Yenumulapalli et al.
2020/0117757 A1 4/2020 Yanamandra et al.
2020/0127823 A1 4/2020 Vats et al.
2020/0204357 A1 6/2020 Seyfried et al.
2020/0244527 A1 7/2020 Sharma et al.
2020/0244549 A1 7/2020 Finch et al.
2020/0250661 A1 8/2020 Padmanabhan et al.
2020/0274900 A1 8/2020 Vaishnavi
2020/0285737 A1 9/2020 Kraus et al.
2020/0358756 A1 11/2020 Rose et al.
2020/0366716 A1 11/2020 Singh et al.
2020/0389463 A1 12/2020 Chen
2021/0036851 A1 2/2021 Villapakkam et al.
2021/0067372 A1 3/2021 Cidon et al.
2021/0067468 A1 3/2021 Cidon et al.
2021/0075870 A1 3/2021 Kempf et al.
2021/0084048 A1 3/2021 Kannan et al.
2021/0142276 A1 5/2021 Gupte
2021/0216190 A1 7/2021 Vakil et al.
2021/0218722 A1 7/2021 Gaylor et al.
2021/0224076 A1 7/2021 Dockter et al.
2021/0224132 A1 7/2021 Barsalou
2021/0224409 A1 7/2021 Avanes et al.
2021/0226956 A1 7/2021 Wei et al.
2021/0234864 A1 7/2021 Dube et al.
2021/0273914 A1 9/2021 Cobb
2021/0279109 A1 9/2021 Ji et al.
2021/0368514 A1 11/2021 Xing
2021/0377272 A1 12/2021 Dasari et al.
2021/0377276 A1 12/2021 Dasari et al.
2021/0377735 A1 12/2021 Latour et al.
2021/0382725 A1 12/2021 Vemula et al.
2021/0383325 A1 12/2021 Loupos et al.
2021/0392048 A1 12/2021 Olden et al.
2021/0392142 A1 12/2021 Stephens et al.
2021/0409403 A1 12/2021 Lewin et al.
2022/0038449 A1 2/2022 Tripp et al.
2022/0091947 A1 3/2022 Kothari et al.
2022/0103566 A1 3/2022 Faulkner
2022/0103618 A1 3/2022 Pinheiro et al.
2022/0116285 A1 4/2022 Abdollahi et al.
2022/0116286 A1 4/2022 Doshi et al.
2022/0129575 A1 4/2022 Goel et al.
2022/0150124 A1 5/2022 Cooley et al.
2022/0159010 A1 5/2022 Bandarupalli et al.
2022/0210018 A1 6/2022 Narula et al.
2022/0244949 A1 8/2022 Iqbal et al.
2022/0255902 A1 8/2022 Woodson
2022/0263793 A1 8/2022 Baker et al.
2022/0263835 A1* 8/2022 Pieczul ............... G06F 21/6218
2022/0271929 A1 8/2022 Villapakkam et al.
2022/0294818 A1 9/2022 Parekh et al.
2022/0300486 A1 9/2022 Venkateshaiah et al.
2022/0335340 A1 10/2022 Moustafa et al.
2022/0337578 A1 10/2022 Mankekar et al.
2022/0353133 A1 11/2022 Shrestha et al.
2022/0353266 A1 11/2022 Ramamurthi et al.
2022/0353267 A1 11/2022 Kundu et al.
2022/0365835 A1 11/2022 Kandasamy et al.
2022/0368813 A1 11/2022 Rossignol et al.
2022/0374271 A1 11/2022 Pogrebinsky et al.
2022/0382590 A1 12/2022 Hashimoto et al.
2022/0398078 A1 12/2022 Segler
2022/0405152 A1 12/2022 Edamadaka et al.
2023/0006889 A1 1/2023 Thyagaturu et al.
2023/0011628 A1 1/2023 Hurley et al.
2023/0068221 A1 3/2023 Magowan et al.
2023/0086475 A1 3/2023 Mosko
2023/0104368 A1 4/2023 Miriyala et al.
2023/0105901 A1 4/2023 Adogla et al.
2023/0108661 A1 4/2023 Adogla et al.
2023/0109926 A1 4/2023 Nair et al.
2023/0110527 A1 4/2023 Bhat et al.
2023/0116463 A1 4/2023 Rath et al.
2023/0123734 A1 4/2023 Oxman et al.
2023/0132478 A1 5/2023 Robinson et al.
2023/0195926 A1 6/2023 Mehta et al.
2023/0224304 A1 7/2023 Lukanov et al.
2023/0229543 A1 7/2023 Mohanty et al.
2023/0244505 A1 8/2023 Hernandez et al.
2023/0275833 A1 8/2023 Hyun et al.
2023/0297962 A1 9/2023 Alabdrabalnabi et al.
2023/0315726 A1 10/2023 Ponjavic et al.
2023/0316348 A1 10/2023 Dageville et al.
2023/0328003 A1 10/2023 Agarwal et al.
2023/0342179 A1 10/2023 Suttle et al.
2023/0362161 A1 11/2023 Spector et al.
2023/0367654 A1 11/2023 Kurian et al.
2023/0370461 A1 11/2023 Kalley et al.
2023/0385286 A1 11/2023 Glickman et al.
2024/0015164 A1 1/2024 Guy et al.
2024/0015165 A1 1/2024 Guy et al.
2024/0053973 A1 2/2024 Ranganathan et al.
2024/0054063 A1 2/2024 Wichelman et al.
2024/0069884 A1 2/2024 Majumdar et al.
2024/0095056 A1 3/2024 Adogla et al.
2024/0095390 A1 3/2024 Chao et al.
2024/0095739 A1 3/2024 Adogla et al.
2024/0095809 A1 3/2024 Adogla et al.
2024/0095865 A1 3/2024 Adogla et al.
2024/0098088 A1 3/2024 Adogla et al.
2024/0098089 A1 3/2024 Adogla et al.
2024/0103818 A1 3/2024 Gallagher et al.
2024/0106832 A1 3/2024 Adogla et al.
2024/0137339 A1 4/2024 Vemulpali
2024/0143351 A1 5/2024 Davis
2024/0154992 A1 5/2024 Martin et al.
2024/0171586 A1 5/2024 Jain et al.
2024/0179146 A1 5/2024 Pinski et al.
2024/0184465 A1 6/2024 Zwiegincew et al.
2024/0205235 A1 6/2024 Batni
2024/0232408 A1 7/2024 Pan et al.
2024/0244053 A1 7/2024 Tian et al.
2024/0259389 A1 8/2024 Wu et al.
2024/0275853 A1 8/2024 Singh et al.
2024/0305622 A1 9/2024 Vijayan et al.
2024/0320240 A1 9/2024 Podder
2024/0330069 A1 10/2024 Atur et al.
2024/0364509 A1 10/2024 Potlapally et al.
2024/0364638 A1 10/2024 Peterson et al.
2024/0364690 A1 10/2024 Doherty et al.
2024/0378307 A1 11/2024 Dcosta
2024/0378518 A1 11/2024 Sparrow et al.
2024/0414169 A1 12/2024 Fang et al.
2024/0414518 A1 12/2024 Joseph et al.
2025/0023844 A1 1/2025 Juneja et al.
2025/0077214 A1 3/2025 Banaal
2025/0085978 A1 3/2025 R C et al.
2025/0097215 A1 3/2025 Vangpat et al.
2025/0097223 A1 3/2025 Brown et al.
2025/0106221 A1 3/2025 Wang et al.
2025/0322077 A1 10/2025 Panwar et al.
2025/0379830 A1 12/2025 Deowanshi et al.

FOREIGN PATENT DOCUMENTS

CN 102656589 A 9/2012
CN 104106276 A 10/2014
CN 108197493 A 6/2018
CN 114091725 A 2/2022
CN 118312629 A 7/2024

(56) References Cited

FOREIGN PATENT DOCUMENTS

| | | | |
|---|---|---|---|
| EP | 2893685 | B1 | 7/2017 |
| EP | 3429156 | A1 | 1/2019 |
| EP | 3271857 | B1 | 4/2020 |
| WO | 2010/088081 | A1 | 8/2010 |
| WO | 2012/006638 | A1 | 1/2012 |
| WO | 2014/039921 | A1 | 3/2014 |
| WO | 2018/010791 | A1 | 1/2018 |
| WO | 2019/212773 | A1 | 11/2019 |
| WO | 2020/252088 | A1 | 12/2020 |
| WO | 2021/051933 | A1 | 3/2021 |
| WO | 2021/145894 | A1 | 7/2021 |
| WO | 2021/150306 | A1 | 7/2021 |
| WO | 2021/150307 | A1 | 7/2021 |
| WO | 2021/150366 | A1 | 7/2021 |
| WO | 2021/150435 | A1 | 7/2021 |
| WO | 2021/174104 | A1 | 9/2021 |
| WO | 2022/005992 | A1 | 1/2022 |
| WO | 2022/104395 | A1 | 5/2022 |
| WO | 2022/104396 | A1 | 5/2022 |

OTHER PUBLICATIONS

"CNAME Record", Wikipedia, Available Online at: https://en.wikipedia.org/w/index.php?title=CNAME_record&oldld=1105641340, Accessed from Internet on Jan. 24, 2024, 4 pages.
"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.
"Developing System Services in Oracle Solaris 11.3", Oracle, Available Online at: https://docs.oracle.com/cd/E53394_01/pdf/E60814.pdf, Sep. 1, 2018, 76 pages.
"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-Aug. 2023.pdf, Retrieved on Jul. 30, 2024, pp. 2.
"External key stores," Retrieved from https://docs.aws.amazon.com/kms/latest/developerguide/keystore-external.html, Mar. 4, 2024, pp. 16.
"Generating and using SSH keys for remote host authentication," Retrieved from https://cloud.ibm.com/docs/ssh-keys?topic=ssh-keys-generating-and-using-ssh-keys-for-remote-host-authentication, Apr. 27, 2023, pp. 5.
"Integrating Skyhigh CASB On-Prem Proxy with aKey Management Server," Retrieved from https://success.skyhighsecurity.com/Skyhigh_CASB/Skyhigh_CASB_Settings/On-Prem_Proxy/zIntegrating_MVISION_Cloud_On-Prem_Proxy_with_a_Key_Management_Server, Sep. 3, 2021, pp. 3.
"Key Management Interoperability Protocol (KMIP)," Retrieved from https://www.encryptionconsulting.com/education-center/kmip/#:~:text=KMIP%20is%20an%20extensible%20communication,by%20simplifying%20encryption%20key%20management., Retrieved on Jul. 30, 2024, pp. 5.
"Multicloud Architecture Partitioned, Cloud Burst and DR", NetApp, Apr. 9, 2020, 7 pages.
"New: Using Amazon EC2 Instance Connect for SSH access to your EC2 Instances," Retrieved from https://aws.amazon.com/blogs/compute/new-using-amazon-ec2-instance-connect-for-ssh-access-to-your-ec2-instances/, Retrieved on Aug. 5, 2024, pp. 12.
"Sepior's Cloud Encryption Technology Now Supports Key Management Interoperability Protocol (KMIP)," SEPIOR, Nov. 10, 2017, pp. 4.
"SSH Certificates Management Automation Made Easy Introducing Certonid," Retrieved from https://mailtrap.io/blog/certonid/, Retrieved on Aug. 5, 2024, pp. 19.
"StorMagic-SvKMS-Data-Sheet," Retrieved from https://stormagic.com/pdf/data-sheet/StorMagic-SvKMS-Data-Sheet.pdf, 2023, pp. 4.
"A Review of Dynamic Resource Management in Cloud Computing Environments" by Aldossary (Year: 2020).
"Cloud-based and containerized testing environments" Revolutionizing text automation by Palanishamy (Year: 2021).
"Enabling the Next Generation of Multi-Region Applications with CockroachDB" by VanBenschoten et al (Year: 2022).
"Location, Location, Partition: How to Beat Latency as Cloud Grows" by Bridgwater (Year: 2020).
"Microsoft publishes secure isolation guidance for Azure and Azure Government" by Vidich (Year: 2020).
"Multicloud Architecture: Partitioned, Cloud Burst and DR" by NetApp (Year: 2020).
"Recent Advances in Energy Efficient Resource Management Techniques in Cloud computing Environments" by Gholipour et al. (Year: 2021).
10 Reasons to Become an AwesomeCloud Channel Partner, Available online at: https://www.awesomecloud.com/about/why-awesomecloud/, 2023, 3 pages.
A Holistic View on Resource Management in Serverless Computing Environments: Taxonomy and Future Directions by Mampage et al. (Year: 2021).
Aldossary, "A Review of Dynamic Resource Management in Cloud Computing Environments", Computer Systems Science and Engineering, vol. 36, No. 3, 2021, pp. 461-476.
Anonymous: "AWS Identity and Access Management user guide—first 400 pages", Mar. 15, 2024, https://web.archive.org/web/20240315183106if_/https://docs.aws.amazon.com/pdfs/IAM/latest/UserGuide/iam-ug.pdf, pp. 4215.
Anonymous: "IAM Roles Anywhere with an external certificate authority : AWS Security Blog", Oct. 20, 2023, Retrieved from https://aws.amazon.com/blogs/security/iam-roles-anywhere-with-an-external-certificate-authority/, pp. 1-18.
Anonymous: "OCI Documentation—Managing Key Pairs on Linux Instances", Mar. 6, 2024, https://web.archive.org/web/20240306214752/https://docs.oracle.com/en-us/iaas/Content/Compute/Tasks/managingkeypairs.htm.
Anonymous: "OCI Documentation—Security Credentials", Dec. 11, 2023, https://web.archive.org/web/20231211222908/https://docs.oracle.com/en-us/iaas/Content/General/Concepts/credentials.htm.
Anonymous: "Set up AWS Private Certificate Authority to issue certificates for use with IAM Roles Anywhere : AWS Security Blog", Retrieved from https://aws.amazon.com/blogs/security/set-up-aws-private-certificate-authority-to-issue-certificates-for-use-with-iam-roles-anywhere/, Nov. 8, 2023, pp. 1-14.
U.S. Appl. No. 18/368,884, Final Office Action, Mailed on Nov. 10, 2025, 58 pages.
U.S. Appl. No. 18/468,024, Notice of Allowance, Mailed on Jun. 23, 2025, 8 pages.
U.S. Appl. No. 18/468,238 , Notice of Allowance, Mailed on Jul. 3, 2025, 9 pages.
AwesomeCloud Services, Available online at: https://www.awesomecloud.com/about/, Accessed from internet on Jan. 18, 2023, 2 pages.
Azure Marketplace Service Providers Guide, Available online at: https://docs.azure.cn/en-us/articles/azure-marketplace/publishguide, Mar. 9, 2021, 9 pages.
Bridgwater, "Location, Location, Partition How to Beat Latency as Cloud Grows", Forbes, Dec. 3, 2020, 5 pages.
Cloud Reseller Program Overview, Available online at: https://www.awesomecloud.com/cloud-reseller-program/, 2023, 3 pages.
CN 102656589 by Auradkar—translation (Year: 2010).
CN 104106276 by Desai—Translation (Year: 2014).
CN 108197493 by Ding—translation (Year: 2017).
Create a Private Marketplace, Available online at: https://cloud.google.com/marketplace/docs/governance/private-marketplace, Accessed from internet on Jan. 18, 2023, 2 pages.
Direct As-a-Service Sales Platform, Available online at: https://www.appxite.com/cloud-saas-sellers, 2022, 3 pages.
Drive Revenue by Selling in AWS Marketplace, Available online at: https://aws.amazon.com/marketplace/partners/management-tour, Accessed from internet on Jan. 18, 2023, 7 pages.

(56) References Cited

OTHER PUBLICATIONS

Enable Google Private Marketplace, Available online at: https://cloud.google.com/marketplace/docs/governance/enable-private-marketplace, Accessed from internet on Jan. 18, 2023, 2 pages.
Ferry, "Kubernetes Namespaces Isolation—What It is, What It Isn't, Life, Universe and Everything", SynActiv, 2021, 13 pages.
Gholipour et al., "Recent Advances in Energy-Efficient Resource Management Techniques in Cloud Computing Environments", New Frontiers in Cloud Computing and Internet of Things, 2021, pp. 31-68.
Girola et al., "IBM Data Center Networking; Planning for Virtualization and Cloud Computing", Redbooks, May 9, 2011, 258 pages.
Google Cloud Platform Services Summary, Available online at: https://cloud.google.com/terms/services, Accessed from internet on Jan. 18, 2023, 25 pages.
Huey Patricia et al., "Oracle Database Security Guide", Nov. 2023, https://web.archive.org/web/20231121145008if_/https://docs.oracle.com/en/database/oracle/oracle-database/23/dbseg/database-security-guide.pdf, pp. 1327.
International Application No. PCT/US2023/074323, International Search Report and the Written Opinion, mailed on Nov. 22, 2023, 15 pages.
U.S. Appl. No. 18/468,047, Non-Final Office Action mailed on May 23, 2025, 11 pages.
Vanbenschoten et al., "Enabling the Next Generation of Multi-Region Applications with CockroachDB", Available Online at https //www cockroachlabs com/pdf/SIGMOD2022 pdf, Jun. 11, 2022, 14 pages.
Vidich, "Microsoft Publishes Secure Isolation Guidance for Azure and Azure Government", Microsoft, Dev Blogs, Aug. 31, 2020, 6 pages.
Want to Resell Public Cloud Services?, Available online at: https://ngkloud.com/resell-public-cloud/, 2021, 3 pages.
What is AWS Marketplace, Available online at: https://docs.aws.amazon.com/marketplace/latest/userguide/what-is-marketplace.html, Accessed from internet on Jan. 18, 2023, 5 pages.
What is Azure Marketplace?, Available online at: https://learn.microsoft.com/en-us/marketplace/azure-marketplace-overview?source=recommendations, Dec. 30, 2022, 9 pages.
What is Google Cloud Marketplace?, Available online at: https://cloud.google.com/marketplace/docs, Accessed from internet on Jan. 18, 2023, 2 pages.
Yedida et al., "Partitioning Cloud-based Microservices", Research Gate, via Deep Learning, Sep. 29, 2021,11 pages.
International Application No. PCT/US2023/074322, International Preliminary Report on Patentability mailed on Mar. 27, 2025, 9 pages.
International Application No. PCT/US2023/074322, International Search Report and Written Opinion, mailed on Nov. 22, 2023, 12 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074325, International Search Report and the Written Opinion, mailed on Nov. 22, 2023, 13 pages.
International Application No. PCT/US2023/074330, International Preliminary Report on Patentability mailed on Mar. 27, 2025, 10 pages.
International Application No. PCT/US2023/074330, International Search Report and the Written Opinion, mailed on Dec. 19, 2023, 14 pages.
International Application No. PCT/US2023/074341, International Preliminary Report on Patentability mailed on Mar. 27, 2025, 11 pages.
International Application No. PCT/US2023/074341, International Search Report and Written Opinion, mailed on Dec. 8, 2023, 15 pages.
International Application No. PCT/US2023/074342, International Preliminary Report on Patentability mailed on Mar. 27, 2025, 10 pages.
International Application No. PCT/US2023/074342, International Search Report and Written Opinion, mailed on Dec. 8, 2023, 13 pages.
International Application No. PCT/US2023/074343, International Preliminary Report on Patentability mailed on Mar. 27, 2025, 9 pages.
International Application No. PCT/US2023/074343, International Search Report and Written Opinion, mailed on Jan. 29, 2024, 13 pages.
International Application No. PCT/US2023/074344, International Preliminary Report on Patentability mailed on Mar. 27, 2025, 10 pages.
International Application No. PCT/US2023/074344, International Search Report and Written Opinion, mailed on Dec. 19, 2023, 13 pages.
International Application No. PCT/US2024/028744, International Search Report and Written Opinion mailed on Jul. 23, 2024, 16 pages.
International Application No. PCT/US2024/028767, "International Search Report and Written Opinion", mailed Sep. 10, 2024, 13 pages.
International Application No. PCT/US2024/028788, International Search Report and Written Opinion mailed on Jul. 23, 2024, 16 pages.
International Application No. PCT/US2024/029210, "International Search Report and Written Opinion", mailed Sep. 16, 2024, 12 pages.
International Application No. PCT/US2024/029417, "International Search Report and Written Opinion", mailed Sep. 16, 2024, 12 pages.
International Application No. PCT/US2024/030201, "International Search Report and Written Opinion", mailed Sep. 16, 2024, 12 pages.
International Application No. PCT/US2024/030208, "International Search Report and Written Opinion", mailed Sep. 16, 2024, 13 pages.
International Application No. PCT/US2024/030212, "International Search Report and Written Opinion", mailed Sep. 16, 2024, 12 pages.
Krichen et al., "Towards Optimizing the Placement of Security Testing Components for Internet of Things Architectures", 2019 Institute of Electrical and Electronics Engineers/ACS 16th International Conference on Computer Systems and Applications (AICCSA), 2019, 2 pages.
Kubernetes Namespaces Isolation—What It Is, What It Isn't, Life, Universe and Everything by Ferry (Year: 2021).
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.
Mampage et al., "A Holistic View on Resource Management in Serverless Computing Environments Taxonomy and Future Directions", Research Gate, ACM Computing Surveys, 2022, 34 pages.
Marketplace Management, Available online at: https://www.appxite.com/platform/manage-marketplace?hsLang=en, 2022, 4 pages.
Marketplace Setup, Available online at: https://www.appxite.com/platform/launch-marketplace?hsLang=en, 2022, 3 pages.
Microsoft Learn, "Azure Key Vault REST API reference", Apr. 19, 2023, Available online at <https://learn.microsoft.com/en-us/rest/api/keyvault/>, 12 pages.
Microsoft Learn: "Connect to a Key Vault via private endpoint—Code Samples", Jul. 6, 2022, Available online at <https://learn.microsoft.com/en-us/samples/azure/azure-quickstart-templates/key-vault-private-endpoint/>, 5 pages.

(56) References Cited

OTHER PUBLICATIONS

Nolle, "Operational Strategies for Isolation in Cloud Computing", Tech Target, Sep. 15, 2021, 6 pages.
Operational strategies for isolation in cloud computing by Nolte (Year: 2021).
Organization Governance for Google Cloud Marketplace, Available online at: https://cloud.google.com/marketplace/docs/governance, Accessed from internet on Jan. 18, 2023, 1 page.
Palanisamy, "Cloud-based and Containerized Testing Environments Revolutionizing Text Automation", International Journal of Science and Research Archive, 2021, 11 pages.
Partitioning Cloud base Microservices by Yedida (Year: 2021).
Power your Cloud Business with StreamOne Cloud Marketplace, Available online at: https://asia.techdata.com/sg/wp-content/uploads/2021/01/SCM_TD_10.23.pdf, 2 pages.
Private Marketplace, Available online at: https://aws.amazon.com/marketplace/features/privatemarketplace, 2023, 4 pages.
Resell Cloud Marketplace Products from Independent Software Vendors (ISVs), Available online at: https://cloud.google.com/marketplace/docs/partners/resell, Accessed from internet on Jan. 18, 2023, 1 page.
Set up your Cloud Marketplace Products for Resale, Available online at: https://cloud.google.com/marketplace/docs/partners/resell/set-up-reselling, Accessed from internet on Jan. 18, 2023, 2 pages.
Towards Optimizing the Placement of Security Testing Components for Internet of Things Architectures by K2019 IEEE/ACS 16th International Conference on Computer Systems and Applications (AICCSA), Abu Dhabi, United Arab Emirates, 2019, pp. 1-2, doi:10.1109/AICCSA47632.2019.9035301. (Year: 2019).
U.S. Appl. No. 18/498,964, Non-Final Office Action mailed on Jul. 29, 2025, 23 pages.
U.S. Appl. No. 18/537,902, Non-Final Office Action, mailed on May 20, 2025, 10 pages.
U.S. Appl. No. 18/368,870, Non-Final Office Action mailed on Mar. 31, 2025, 11 pages.
U.S. Appl. No. 18/368,884, Non-Final Office Action mailed on Mar. 6, 2025, 44 pages.
U.S. Appl. No. 18/468,037, Non-Final Office Action mailed on Mar. 20, 2025, 8 pages.
U.S. Appl. No. 18/468,044, Non-Final Office Action mailed on May 19, 2025, 22 pages.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.
Anonymous: "Oracle Cloud Infrastructure Documentation—Security Guide for Exadata Database Service on Cloud@Customer Systems", Apr. 1, 2023, XP093181902.
Anonymous: "Oracle Cloud Infrastructure Documentation—Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.
Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973.
Anonymous: "Oracle Operator Access Control Configuration and Administration Guide", Nov. 18 2022, XP093181896.
Anonymous: "Oracle Public Sector Licensing and Permitting", 2022, XP093184298.
Anonymous: "Oracle Sovereign Cloud", Feb. 15 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
Brassil, Physical Layer Network Isolation in Multi-tenant Clouds, Institute of Electrical and Electronics Engineers 30th International Conference on Distributed Computing Systems Workshops, Jul. 2010, pp. 77-81.
Study of Software as a Service Support Platform for Small and Medium Businesses Chang-Jie Guo, Wei Sun, Zhong-Bo Jiang, Ying Huang, Bo Gao, and Zhi-Hu Wang (Year: 2011).
U.S. Appl. No. 18/368,863, Non-Final Office Action mailed on Jun. 17, 2025, 11 pages.
U.S. Appl. No. 18/368,881, Non-Final Office Action mailed on Jan. 6, 2026, 25 pages.
U.S. Appl. No. 18/468,037, Notice of Allowance mailed on Dec. 23, 2025, 9 pages.
U.S. Appl. No. 18/468,047, Final Office Action mailed on Jan. 15, 2026, 10 pages.

* cited by examiner

SYSTEM AND METHOD FOR ENFORCING SERVICE CONTROL POLICIES FOR SERVICES AND SERVICE FEATURES

CLAIM OF PRIORITY AND CROSS-REFERENCE TO RELATED APPLICATIONS

This application claims the benefit of priority to U.S. Provisional Patent application titled "SYSTEM AND METHOD FOR PROVIDING DEDICATED CLOUD ENVIRONMENTS FOR USE WITH A CLOUD COMPUTING INFRASTRUCTURE", Application No. 63/462,868, filed Apr. 28, 2023; and is related to U.S. Provisional patent application titled "SYSTEM AND METHOD FOR PROVIDING DEDICATED CLOUD ENVIRONMENTS FOR USE WITH A CLOUD COMPUTING INFRASTRUCTURE", Application No. 63/462,875, filed Apr. 28, 2023; U.S. Provisional patent application titled "SYSTEM AND METHOD FOR PROVIDING DEDICATED CLOUD ENVIRONMENTS FOR USE WITH A CLOUD COMPUTING INFRASTRUCTURE", Application No. 63/462,878, filed Apr. 28, 2023; U.S. Provisional patent application titled "SYSTEM AND METHOD FOR PROVIDING DEDICATED CLOUD ENVIRONMENTS FOR USE WITH A CLOUD COMPUTING INFRASTRUCTURE", Application No. 63/462,880, filed Apr. 28, 2023; U.S. Provisional patent application titled "SYSTEM AND METHOD FOR PROVIDING DEDICATED CLOUD ENVIRONMENTS FOR USE WITH A CLOUD COMPUTING INFRASTRUCTURE", Application No. 63/462,882, filed Apr. 28, 2023; and U.S. Provisional patent application titled "SYSTEM AND METHOD FOR PROVIDING DEDICATED CLOUD ENVIRONMENTS FOR USE WITH A CLOUD COMPUTING INFRASTRUCTURE", Application No. 63/462,885, filed Apr. 28, 2023; each of which above applications and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to systems and methods for providing cloud environments, for use by tenants of a cloud infrastructure environment in accessing software products, services, or other offerings associated with the environment, including methods for defining and enforcing service control policies directed to services and service features.

BACKGROUND

A cloud computing environment can be used to provide access to a range of complementary cloud-based components, such as software applications or services, that enable organizations or enterprise customers to operate their applications and services in a highly-available hosted environment.

The benefits to an organization in moving their application and service needs to a cloud environment include a reduction in the cost and complexity of designing, building, operating, and maintaining their own on-premise data center, software application framework, or other information technology infrastructure; allowing them to instead focus on managing their day-to-day business.

SUMMARY

Embodiments described herein are generally related to systems and methods for providing cloud environments, for use by tenants of a cloud infrastructure environment in accessing software products, services, or other offerings associated with the environment, including methods for defining and enforcing service control policies directed to services and service features.

In accordance with an embodiment, the system comprises a service control repository or service catalog that provides a definition of the services and service features, together with service control policies or rules that define availability or access to the service features. A service control policy framework, comprising a feature management service, determines, by reference to a hierarchy of entities defining the service control policies, which different entities can control the availability of particular services or service features to end users.

In accordance with an embodiment, a service control policy can be controlled by a hierarchy of entities or at multiple levels. At each level within the hierarchy, only the service features that have been made available by a higher-level entity can be controlled by a service control policy at that level.

DETAILED DESCRIPTION

A cloud computing or cloud infrastructure environment can be used to provide access to a range of complementary cloud-based components, such as software applications or services, which enable organizations or enterprise customers to operate their applications and services in a highly-available hosted environment.

The benefits to an organization in moving their application and service needs to a cloud infrastructure environment include a reduction in the cost and complexity of designing, building, operating, and maintaining their own on-premise data center, software application framework, or other information technology infrastructure; allowing them to instead focus on managing their day-to-day business.

Cloud Infrastructure Environments

Figure 1:
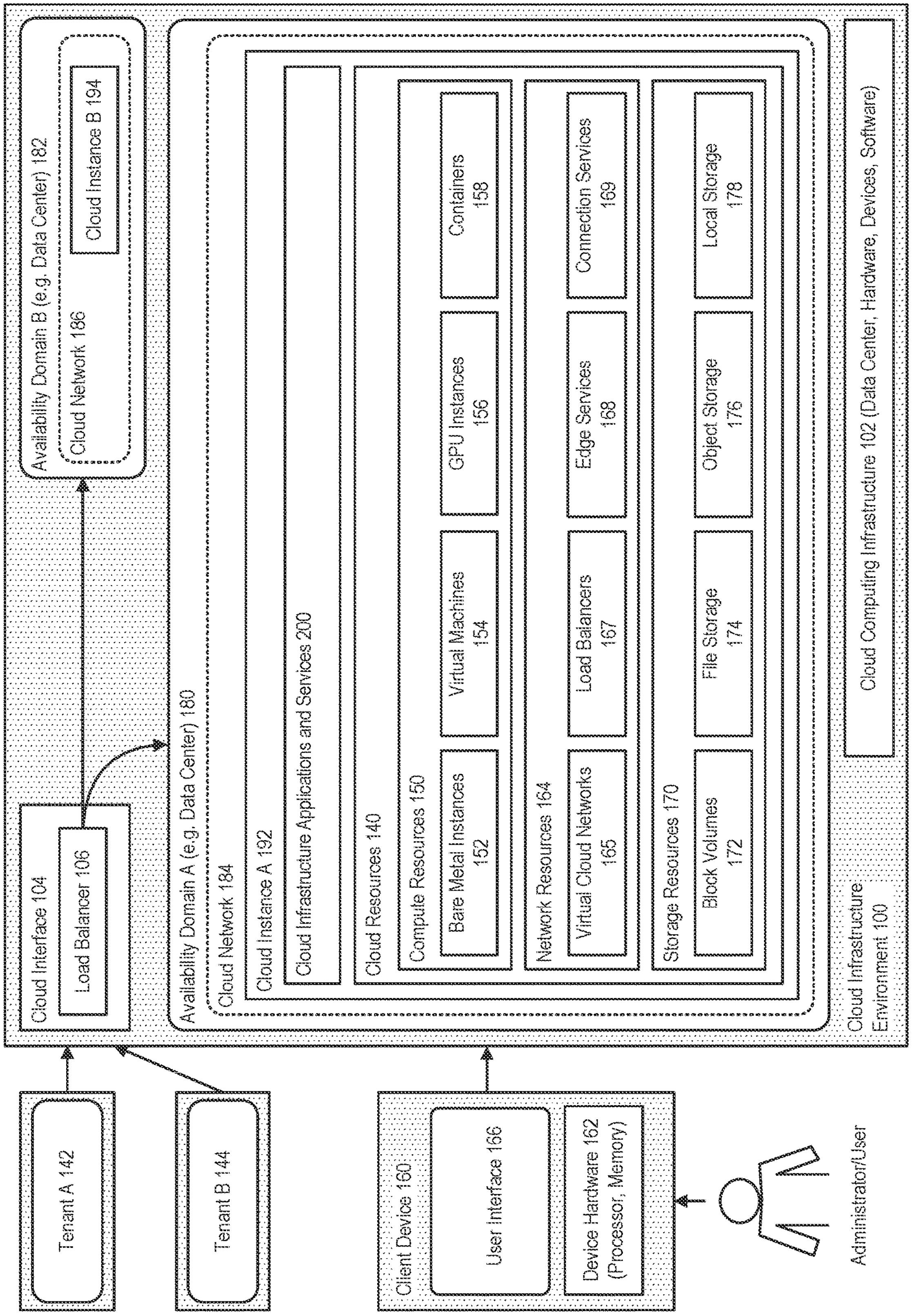
FIG. 1 illustrates a system for providing a cloud infrastructure environment, in accordance with an embodiment.
Figure 2:
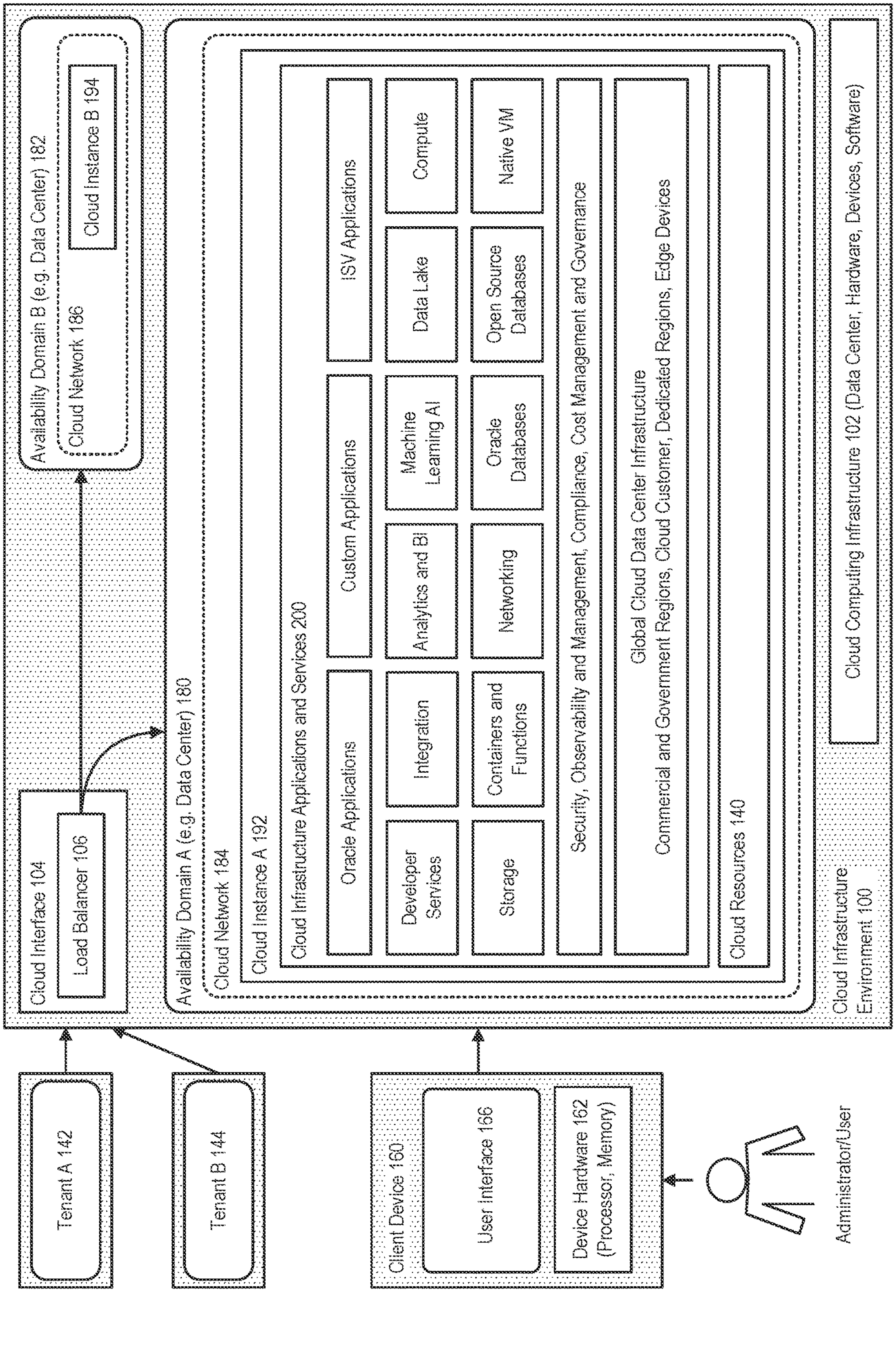
FIG. 2 further illustrates how a cloud infrastructure environment can be used to provide cloud-based applications or services or services, in accordance with an embodiment.

FIGS. 1 and 2 illustrate a system for providing a cloud infrastructure environment, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers 106.

In accordance with an embodiment, the cloud infrastructure environment supports the use of availability domains, such as, for example, availability domains A 180, B 182, which enables customers to create and access cloud networks 184, 186, and run cloud instances A 192, B 194.

In accordance with an embodiment, a tenancy can be created for each cloud tenant/customer, for example tenant A 142, B 144, which provides a secure and isolated partition within the cloud infrastructure environment within which the customer can create, organize, and administer their cloud resources. A cloud tenant/customer can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator other user to communicate with the cloud infrastructure environment via a network such as, for example, a wide area network, local area network, or the Internet, to create or update cloud services.

In accordance with an embodiment, the cloud infrastructure environment provides access to shared cloud resources 140 via, for example, a compute resources layer 150, a network resources layer 164, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud infrastructure environment can provide control of physical host (bare metal) machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 165, load balancers 167, edge services 168, and/or connection services 169.

In accordance with an embodiment, the storage resources layer can comprise a number of resources, such as, for example, data/block volumes 172, file storage 174, object storage 176, and/or local storage 178.

As illustrated in FIG. 2, in accordance with an embodiment, the cloud infrastructure environment can include a range of complementary cloud-based components, for example as cloud infrastructure applications and services 200, that enable organizations or enterprise customers to operate their applications and services in a highly-available hosted environment.

By way of example, in accordance with an embodiment, a self-contained cloud region can be provided as a complete, e.g., Oracle Cloud Infrastructure (OCI) dedicated region within an organization's data center that offers the data center operator the agility, scalability, and economics of a public cloud, while retaining full control of their data and applications to meet security, regulatory, or data residency requirements.

For example, in accordance with an embodiment, such an environment can include racks physically and managed by a cloud infrastructure provider; customer's racks; access for cloud operations personnel for setup and hardware support; customer's data center power and cooling; customer's floor space; an area for customer's data center personnel; and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's public cloud regions, such as, for example, ERP, Financials, HCM, and SCM. A customer can seamlessly lift and shift legacy workloads using the cloud infrastructure provider's services, for example bare metal compute, VMs, and GPUs; database services, for example Autonomous Database; or container-based services, for example Container Engine for Kubernetes.

In accordance with an embodiment, a cloud infrastructure environment can operate according to infrastructure-as-a-service (IaaS) model that enables the environment to provide virtualized computing resources over a public network (e.g., the Internet).

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components (example services include billing software, monitoring software, logging software, load balancing software, or clustering software). Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not be, a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries, or daemons). This is often managed by the cloud infrastructure provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In accordance with an embodiment, IaaS provisioning may refer to acquiring computers or virtual hosts for use, and even installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 3:
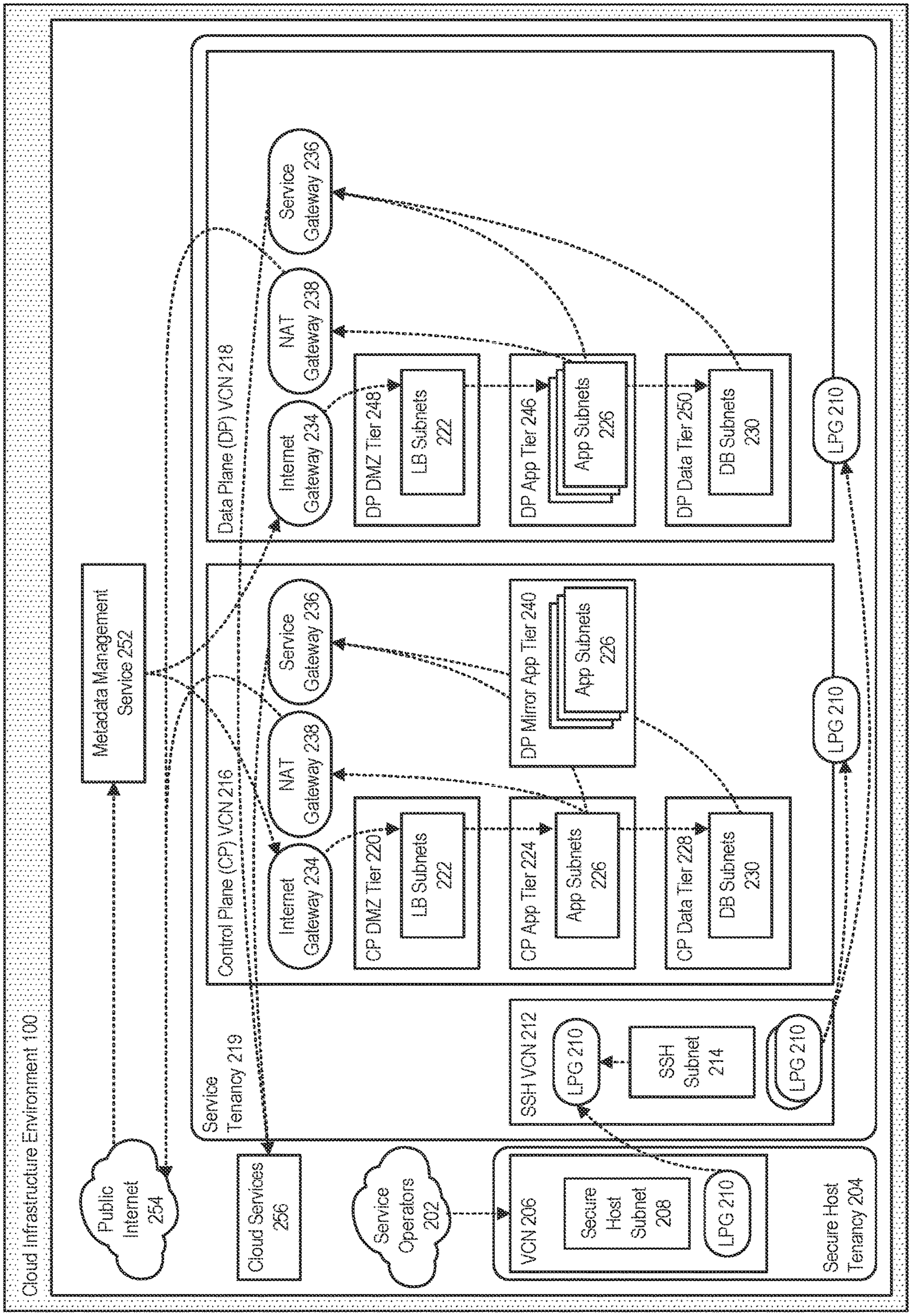
FIG. 3 illustrates an example cloud infrastructure architecture, in accordance with an embodiment.

FIG. 3 illustrates an example cloud infrastructure architecture, in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices, which may be portable handheld devices (e.g., a telephone, a computing tablet, a personal digital assistant (PDA)) or wearable devices (e.g., a head mounted display), running software such as Microsoft Windows, and/or a variety of mobile operating systems such as IOS, Android, and the like, and being Internet, e-mail, short message service (SMS), or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Chrome. Alternatively, or in addition, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnet(s) 222, a control plane app tier 224 that can include app subnet(s) 226, and a control plane data tier 228 that can include database (DB) subnet(s) 230 (e.g., frontend DB subnet(s) and/or backend DB subnet(s)). The LB subnet (s) contained in the control plane DMZ tier can be communicatively coupled to the app subnet(s) contained in the control plane app tier, and an Internet gateway 234 that can be contained in the control plane VCN, and the app subnet(s) can be communicatively coupled to the DB subnet(s) contained in the control plane data tier and a service gateway 236 and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier 246, a data plane DMZ tier 248, and a data plane data tier 250. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way: the service gateway can make API calls to cloud services, and cloud services can send requested data to the service gateway. Generally, cloud services may not initiate API calls to the service gateway.

In accordance with an embodiment, the secure host tenancy can be directly connected to the service tenancy, which may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example create, read, update, or delete (CRUD) operations, through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both of which may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage, which may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy, which may be isolated from the public Internet.

Figure 4:
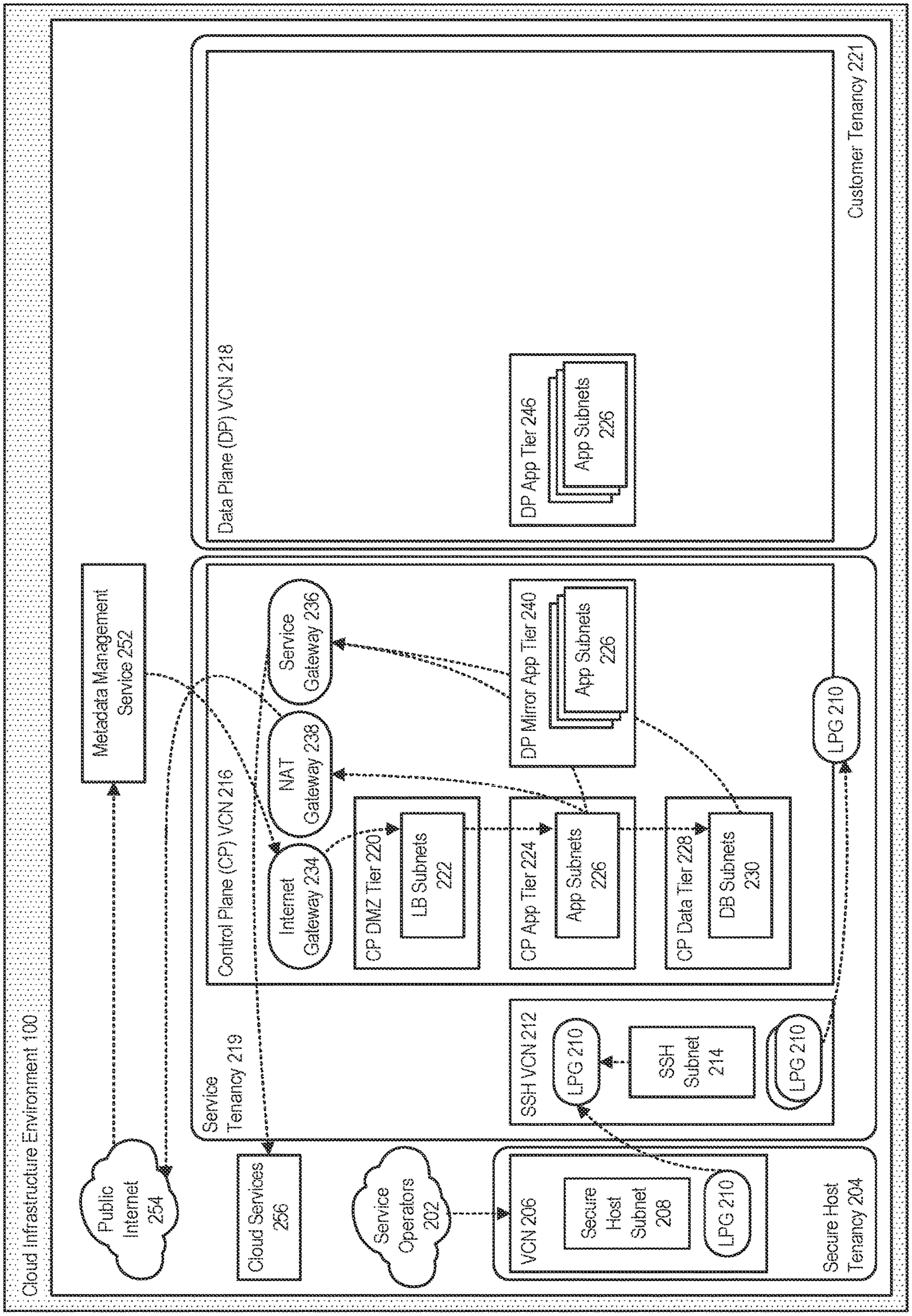
FIG. 4 illustrates another example of a cloud infrastructure architecture, in accordance with an embodiment.

FIG. 4 illustrates another example of a cloud infrastructure architecture, in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources that are provisioned in the control plane VCN that is contained in the service tenancy, to be deployed or otherwise used in the data plane VCN that is contained in the customer tenancy.

In accordance with an embodiment, a customer of the cloud infrastructure provider may have databases that are managed and operate within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, of the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with Deployment 1 in Region 2.

Figure 5:
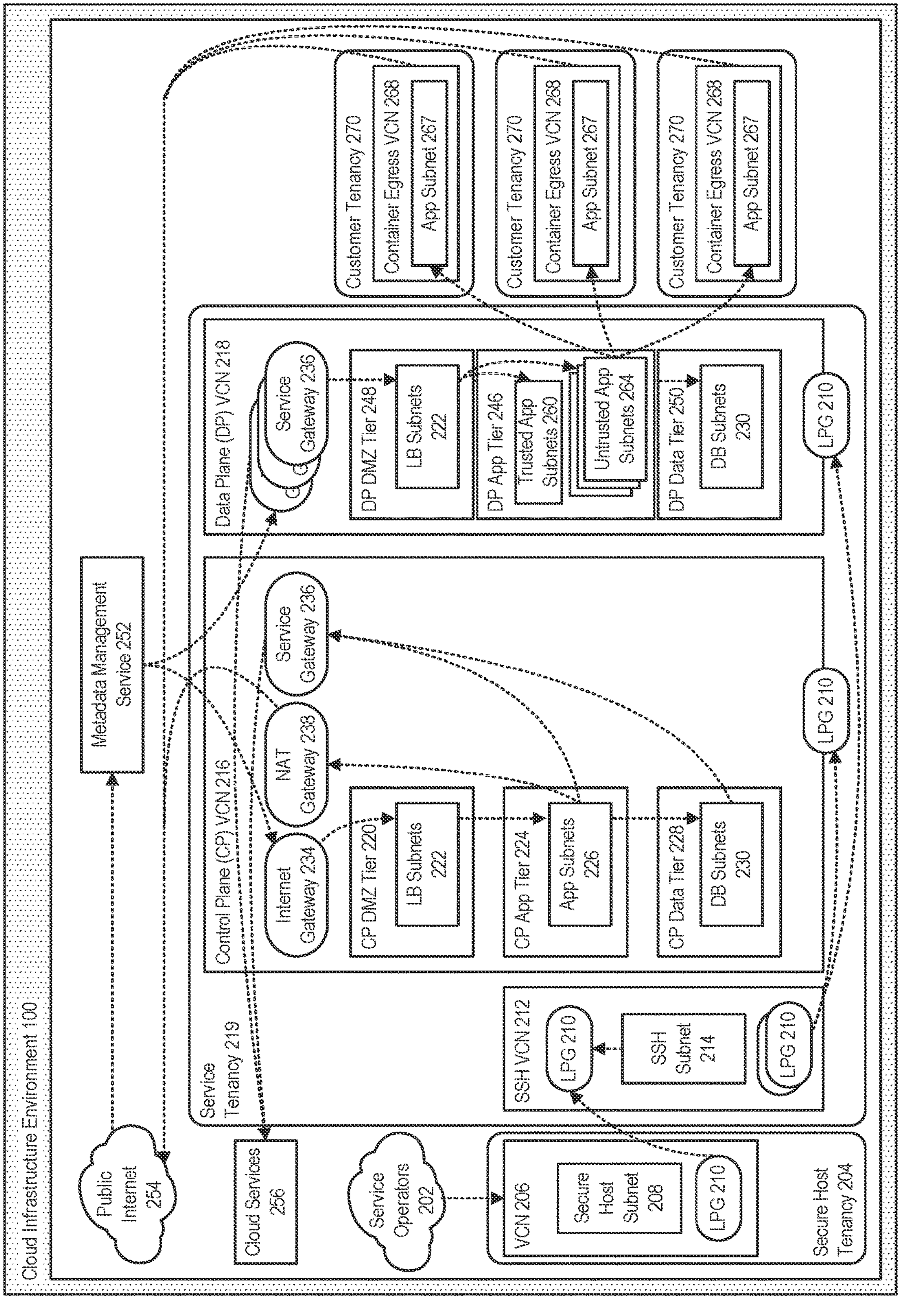
FIG. 5 illustrates another example of a cloud infrastructure architecture, in accordance with an embodiment.

FIG. 5 illustrates another example of a cloud infrastructure architecture, in accordance with an embodiment.

As illustrated in FIG. 5, in accordance with an embodiment, the trusted app subnet(s) 260 can be communicatively coupled to the service gateway contained in the data plane VCN, the NAT gateway contained in the data plane VCN, and DB subnet(s) contained in the data plane data tier. The untrusted app subnet(s) 264 can be communicatively coupled to the service gateway contained in the data plane VCN and DB subnet(s) contained in the data plane data tier.

The data plane data tier can include DB subnet(s) that can be communicatively coupled to the service gateway contained in the data plane VCN.

In accordance with an embodiment, untrusted app subnet (s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs, and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)), which may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet (s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s), and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled; or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
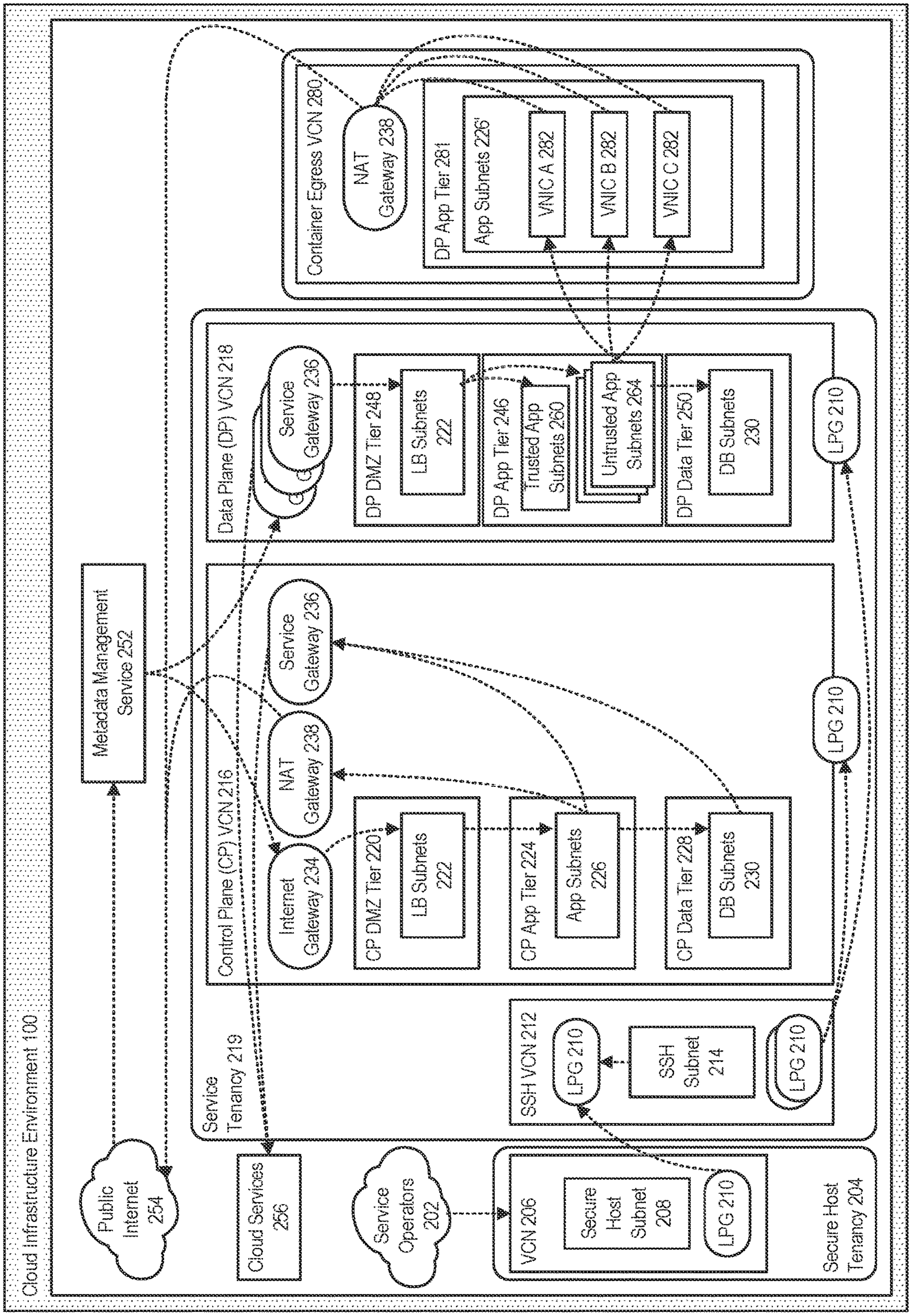
FIG. 6 illustrates another example of a cloud infrastructure architecture, in accordance with an embodiment.

FIG. 6 illustrates another example of a cloud infrastructure architecture, in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet (s) can include primary VNICs that can be communicatively coupled to tenant virtual machines (VMs) residing within the untrusted app subnet(s). Each tenant VM can run code in a respective container, and be communicatively coupled to an app subnet that can be contained in a data plane app tier 281 that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that requests a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Cloud Environments

In accordance with an embodiment, a cloud infrastructure environment can be used to provide dedicated cloud environments, for example as one or more private label cloud environments, for use by tenants of the cloud infrastructure environment in accessing subscription-based software products, services, or other offerings associated with the cloud infrastructure environment.

Figure 7:
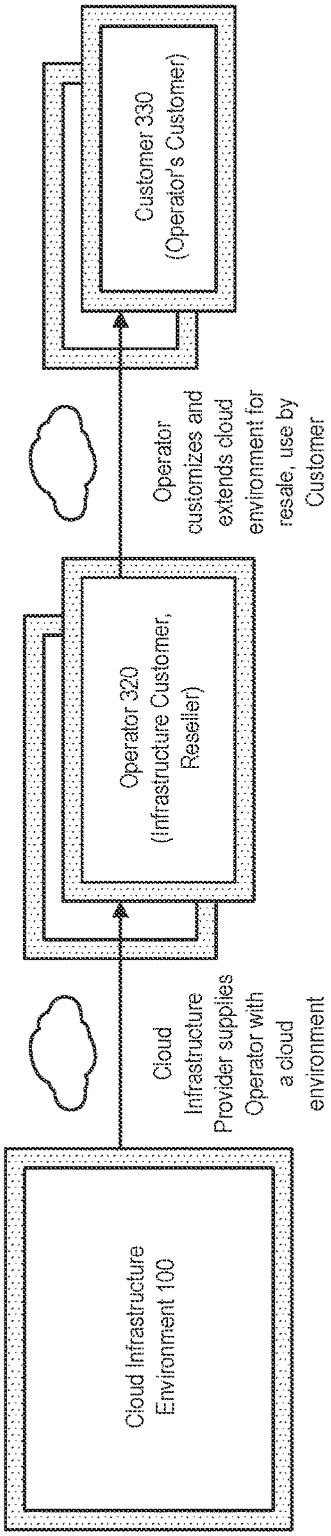
FIG. 7 illustrates a system that provides dedicated or private label cloud environments, for use by tenants or customers of a cloud infrastructure environment, in accordance with an embodiment.

FIG. 7 illustrates how the system can provide dedicated or private label cloud environments, for use by tenants or customers of a cloud infrastructure environment, in accordance with an embodiment.

Although several of the examples described herein illustrate various systems, methods, and/or techniques as may be used in the context of providing private label cloud (PLC) environments, in accordance with various embodiments, the systems, methods, and techniques described herein can be used, within or with other types of cloud environments.

As illustrated in FIG. 7, in accordance with an embodiment, a cloud infrastructure provider can supply an operator 320, for example a cloud infrastructure customer operating as a reseller, with one or more cloud environments (e.g., a PLC environment) or realms. The operator/reseller can then customize and extend the cloud environment for use by (their) customer 330, for use in accessing subscription-based software products, services, or other offerings associated with the cloud infrastructure environment.

For purposes of illustration, examples of such subscription-based products, services, or other offerings may include various cloud infrastructure software products, such as Oracle Fusion Applications products, or other types of products or services that allow customers to subscribe to usage of those products or services.

Figure 8:
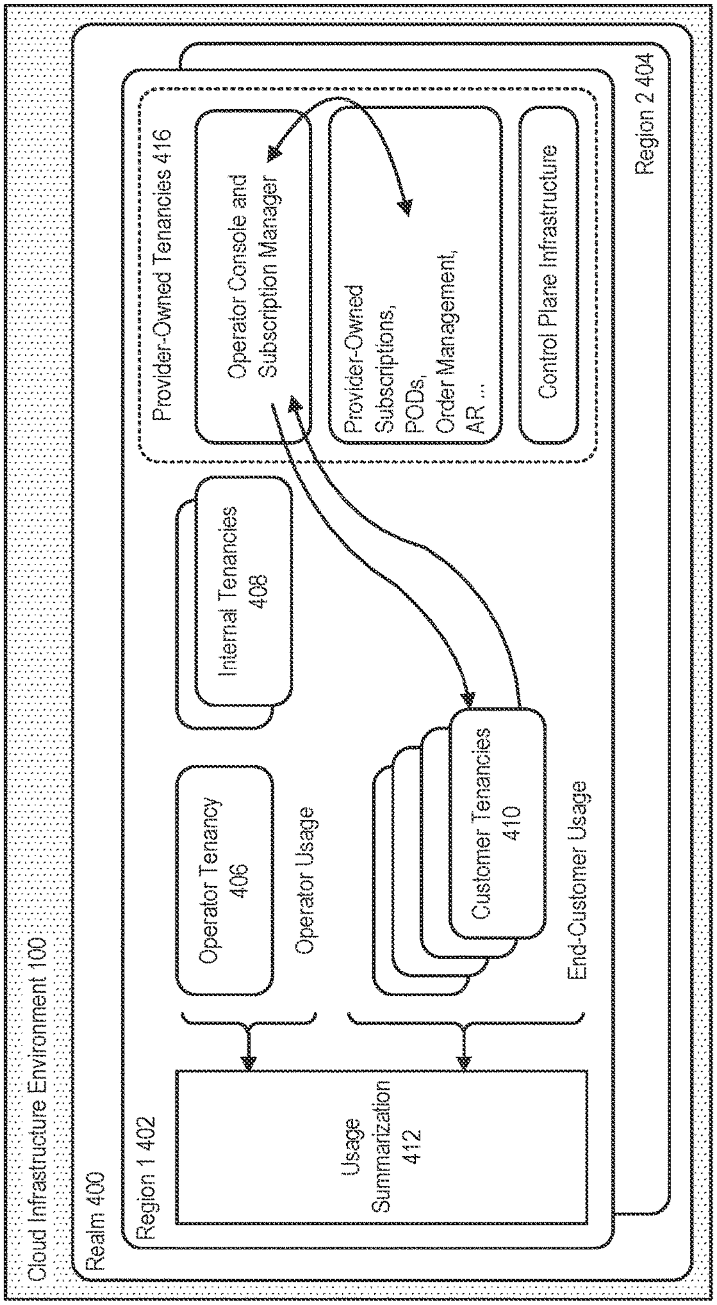
FIG. 8 further illustrates the use of cloud realms, for use by tenants or customers of a cloud infrastructure environment, in accordance with an embodiment.

FIG. 8 further illustrates the use of cloud realms, for use by tenants or customers of a cloud infrastructure environment, in accordance with an embodiment.

As illustrated in FIG. 8, in accordance with an embodiment, the system can include a cloud subscription service or component, referred to herein in some embodiments as a subscription manager, that exposes one or more subscription management APIs for creating orders used to onboard new customers, or to launch a workflow that creates a subscription and orchestrates billing and pricing service or other components for use with a cloud realm 400.

In accordance with an embodiment, when an operator (e.g., a PLC operator) or their customer requests a cloud environment, the system creates a realm, for use within a region 402, 404; together with one or more provider-owned tenancies 416. These tenancies allow a region to function with its required service infrastructure; and are administered by the cloud infrastructure provider.

In accordance with an embodiment, a first step in the process is to create an operator tenancy 406 for the operator, before the region and associated realms are turned over to them for subsequent management. The operator then becomes the administrator of this tenancy, within which they can view and manage everything that happens within that region, including their customer accounts and usage 412 by those customers of cloud resources.

Generally, once the region has been turned over or provided to the operator, the cloud infrastructure provider cannot subsequently access the data within the operator tenancy, unless the operator authorizes the cloud infrastructure provider to do so, for example to provide troubleshooting of issues that may arise.

In accordance with an embodiment, the operator can then create additional internal tenancies 408, intended for their own use internally, for example to assess what the end user or customer experience will be, or to provide a sales demo tenancy, or to operate a database for their own internal use. The operator can also create one or more customer tenancies 410, of which the end user or customer will be the administrator. Cloud infrastructure usage, for example compute, storage, and other infrastructure resources, is consolidated by operator, reflecting both their usage and that of their customers, and reported to the cloud infrastructure provider.

In accordance with an embodiment, a user interface or console can be provided that allows the operator to manage its customer accounts and customer-offered services. A cloud infrastructure provider can also use a cloud infrastructure tenancy, for example a Fusion Applications tenancy, to install any needed infrastructure services for use by the operator and their customers.

Figure 9:
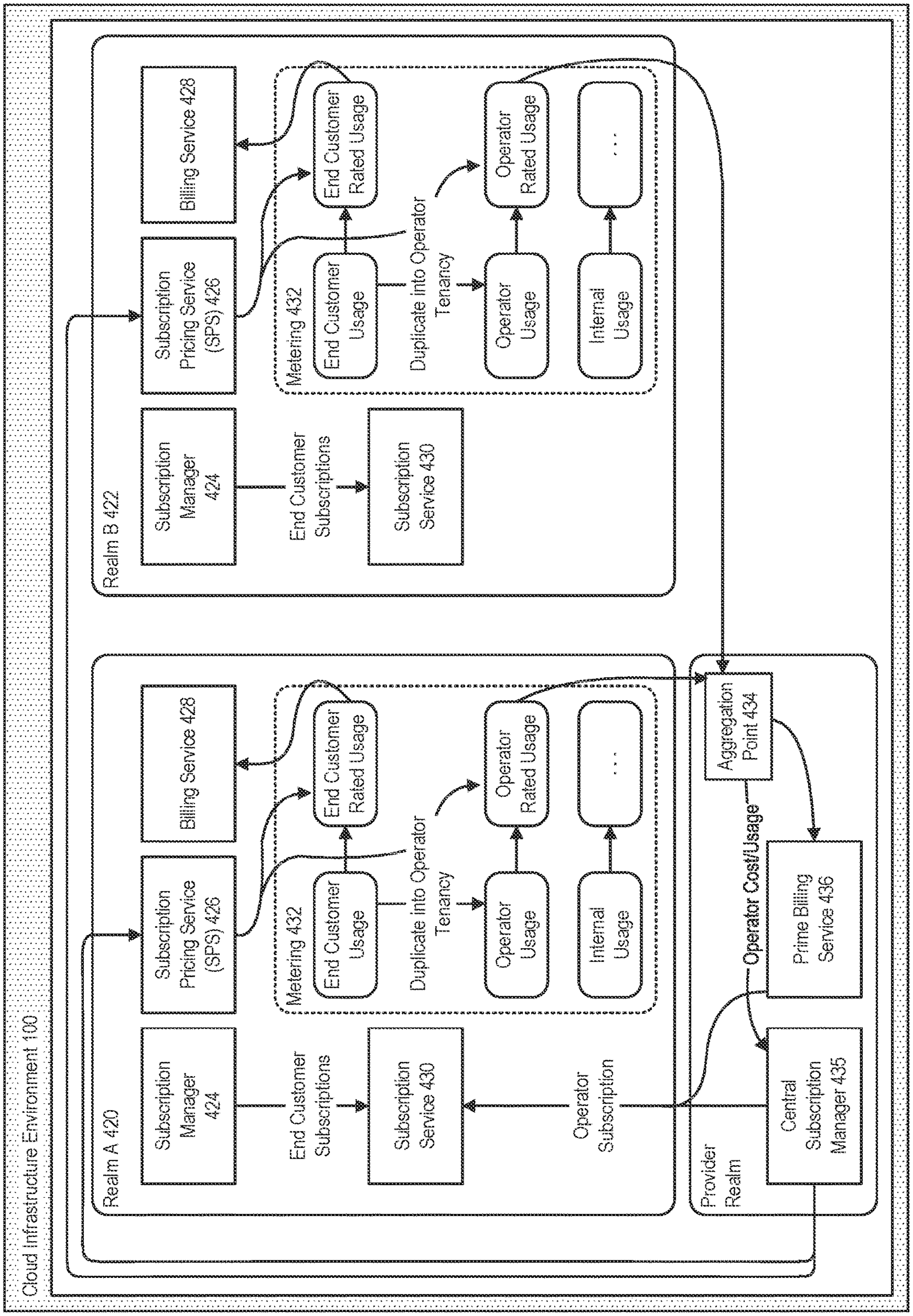
FIG. 9 further illustrates the use of cloud realms, for use by tenants or customers of a cloud infrastructure environment, in accordance with an embodiment.

FIG. 9 further illustrates the use of cloud realms, for use by tenants or customers of a cloud infrastructure environment, in accordance with an embodiment.

As illustrated in FIG. 9, in accordance with an embodiment, a subscription manager 424 service or component exposes one or more subscription management APIs for creating orders used to onboard new customers, or to launch a workflow that creates a subscription and orchestrates billing and pricing service or other components.

In accordance with an embodiment, the system can also include a billing service 428 or component that operates upon a billing account or logical container of subscriptions and preferences used to produce an invoice for a customer.

In accordance with an embodiment, the system can also include a subscription pricing service (SPS) 426 or component, which operates upon a product catalog that defines which products can be purchased by a customer, and can be used to provide a price list (e.g., a rate card) that the pricing service also owns.

In accordance with an embodiment, to support the sales process through which a subscription is created in a realm 420, 422, products can be selected from a product hub. Once an order is created via a subscription service 430, a subscription is created in the subscription manager which thereafter manages the life cycle of that subscription, and provisions what needs to be provisioned in downstream services. The SPS component then manages the aspects of pricing and usage, for use in charging the end cost to the operator or their ability to charge their customers. Usage events are forwarded to the billing service or component, where depending on the billing preferences of the subscription, invoices are created and pushed to an accounts receivables component.

In accordance with an embodiment, although the services that are offered in a realm report their usage to a metering service or component 432, such usage does not have any price associated with it. A rating process determines how much each specific event costs, for example by applying rate cards, determines a unit and cost for that subscription, associates the cost to that record, and then forwards that to the billing service or component.

As further illustrated in FIG. 9, in accordance with an embodiment, an operator may control multiple realms A, B—for example an operator that operates in multiple countries may wish to operate a data center that is completely isolated for the United States of America, and a separate data center that is completely isolated for Europe, for example to address governance or regulatory requirements. In accordance with an embodiment, the usage associated with these multiple realms can be aggregated 434, for use by a central subscription manager 435, and where applicable a prime billing service 436, in billing the operator.

The examples of various systems illustrated above are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Cloud Subscriptions

Figure 10:
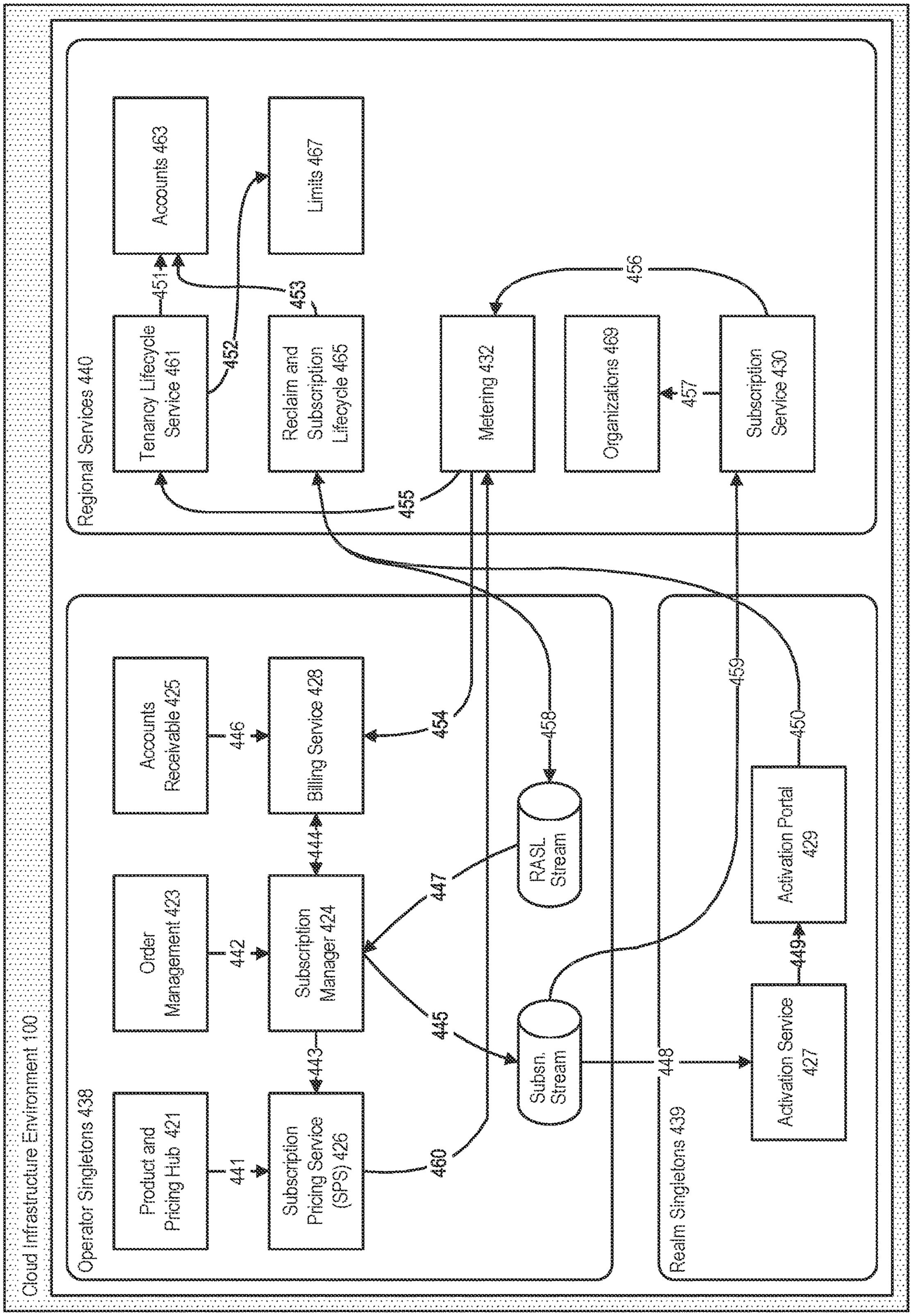
FIG. 10 illustrates a system for providing access to software products or services in a cloud computing or other computing environment, in accordance with an embodiment.

FIG. 10 illustrates a system for providing access to software products or services in a cloud computing or other computing environment, in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various cloud infrastructure software products or services that allow customers to subscribe to usage of those products or services.

In accordance with an embodiment, the environment can include a plurality of components provided as operator singletons 438, realm singletons 439, and regional services 440, as further described below.

In accordance with an embodiment, a subscription can include artifacts such as, for example, products, commits, billing model, and state. The subscription manager service or component can expose one or more subscription management APIs for creating orders used to onboard new customers, or to launch a workflow that creates a subscription and orchestrates creating the proper footprints in billing and pricing service or components, as further described below.

In accordance with an embodiment, the billing service or component operates upon a billing account or logical container of subscriptions and preferences used to produce an invoice. Each billing account generates one invoice per billing cycle. The billing service includes a first pipeline that accepts usage and cost from a metering service or component through a REST API, wherein billing writes the usage to a database from which billing workers aggregate and calculate balances; and a second pipeline responsible for taking the aggregated usage and commitments and calculating charges over a billing interval.

In accordance with an embodiment, the subscription pricing service (SPS) 426 or component operates upon a product catalog that defines which products can be purchased by a customer. The product catalog forms the backbone of a price list (i.e., rate card) that the pricing service also owns. Rate cards are modeled as pricing rules on top of public list prices. The pricing service maintains a single price list for all products, new product prices can be added, and existing prices changed. The price list has a full history, the latest version being the current rate card. Since some contracts may require a snapshot of the rate card be taken, the pricing service handles this by recording the time a customer's rate card is created, and then querying the price list at that time.

In accordance with an embodiment, the SPS or pricing service is responsible for communicating with a product and pricing hub 421, to provide information about products, global price list, and end user or customer's subscription specific price lists and discounts. For example, in accordance with an embodiment, SPS can synchronize product information from a product hub, and a global price list from a pricing hub.

In accordance with an embodiment, the subscription manager service or component operates as an upstream service to receive new order requests from an order management 423 component, for example from an Oracle Fusion Order Management environment. The subscription manager service or component can provide subscription information to the SPS service, including subscription details such as time of quote configured, or subscription type (Commitment, PayG), to help SPS to determine an effective base price (Rate Card) for the subscription. The subscription manager service or component can also send discounts for subscriptions received from the order management component, which SPS stores as a pricing rule entity.

In accordance with an embodiment, the SPS service runs as a background process to manage a rate cards service or component, which is responsible for generating rate cards for new subscriptions and updating those rate cards when new price changes occur. The SPS service can provide APIs to access rate cards and pricing rules. A metering in-line rating engine can utilize these APIs to obtain subscription-specific rate cards and pricing rules, and then use this data for cost calculations.

In accordance with an embodiment, additional SPS components can include, for example, a pricing/product hub integration component, that allows an operator entity providing subscription-based products, services, or other offerings within the environment, to manage their product and price list, for example as provided by a product hub and pricing hub respectively.

For example, in accordance with such an embodiment, an SPS product integration flow can listen to create/update events in the product hub and make calls to an SPS product API. Similarly, an SPS pricing integration flow can pull new price list creation from the pricing hub and call respective SPS pricing APIs.

In accordance with an embodiment, the system can also include an SPS core module that provides APIs to manage and access pricing entities. Pricing entities can be accessed by internal services, for example an inline rating engine.

In accordance with an embodiment, the system can also include a rate card manager component. The SPS service maintains the single base price for a product at a given time.

However, product prices for subscription are dependent on a base price at quote configuration time and price list change policy attributes of subscriptions. The SPS service internally maintains the price to be used for subscription using these properties. All such price lists are grouped in a rate card. The rate card manager can create and maintain the rate card, listen to price list changes and update existing rate cards with the new price, and listen to new subscriptions and assigns the rate card based on subscription properties.

In accordance with an embodiment, the SPS service is responsible for managing pricing rules for a subscription, including discounts offered to an end user or customer. Pricing rules eligibility can be based on attributes of products, such as discount group, product category or specific SKUs. Internally SPS needs to identify the list of products for which these rules will be applicable. To accomplish this, a rule decoder engine can compile the pricing rules in a format such that an in-line rating engine can consume the information for cost calculation. This compilation process can be triggered when products or pricing rules are created or updated.

As illustrated by way of example in FIG. 10, in accordance with an embodiment: at 441, a product and price information managed in, e.g., Fusion Applications, is sent to the SPS component.

At 442, orders are sent to the subscription manager component to create subscriptions, rate cards and billing accounts.

At 443, pricing configuration and pricing rules are sent to SPS for new orders.

At 444, the subscription manager component is used to set up a billing account in the billing service or component.

At 445, the subscription manager component publishes events to an subscription manager streaming component.

At 446, a charge data is sent to an accounts receivable component 425 to generate invoices.

At 447, the subscription manager component consumes reclaim and subscription lifecycle (RASL) events from subscription manager streaming.

At 448, an activation service 427 reads the subscription manager event stream.

At 449, a customer obtains activation data from an activation portal 429.

At 450, a tenancy lifecycle service 461 provisions a tenancy as part of the subscription activation.

At 451, the tenancy lifecycle service creates, within an accounts 463 component, an accounts footprint during account provisioning.

At 452, the tenancy lifecycle service sets, within a limits service 467, a limits template during account provisioning.

At 453, the accounts component acts as a downstream RASL client to handle a legacy reclamation and subscription lifecycle 465.

At 454, aggregated cost and usage is sent to the billing service 428 or component.

At 455, an organization can create child tenancies using the tenancy lifecycle service.

At 456, a metering service 432 or component obtains subscription mapping data.

At 457, the subscription service 430 obtains organization data 469 for subscription mappings.

At 458, the RASL component reads the subscription manager event stream.

At 459, the subscription service reads the subscription manager event stream; and at 460, the metering service or component obtains a rate card data for each subscription, which can then be used in charging the end cost to the operator or their ability to charge their customers.

The above examples are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Service Control Policies

Within a cloud infrastructure environment, there may not be appropriate control mechanisms for cloud operators (including cloud infrastructure providers themselves) to manage the offerings available to end users (e.g., customers).

For example, a cloud infrastructure provider's internal service teams may use a complex set of limits templates, features flags, and allow lists, for releasing functionality only when/were supported. However, such controls are not suitable for use by an external, e.g., PLC realm operator or administrator.

In accordance with an embodiment, the system comprises a service control repository or service catalog that provides a definition of the services and service features, together with service control policies (SCPs) or rules that define availability or access to the service features. A service control policy framework, comprising a feature management service, determines, by reference to a hierarchy of entities defining the service control policies, which different entities can control the availability of particular services or service features to end users.

In accordance with an embodiment, a service control policy can be controlled by a hierarchy of entities or at multiple levels. At each level within the hierarchy, only the service features that have been made available by a higher-level entity can be controlled by a service control policy at that level.

In accordance with an embodiment, when used in cloud infrastructure environments that offer services or service features as products to customers, for example on a subscription basis, the service catalog can operate in the manner of a product catalog for use with those products.

In accordance with an embodiment, the feature management service determines how different entities, e.g., a cloud infrastructure provider, or realm operators themselves, can control which services or service features are to be made available to end users (e.g., tenants).

For example, cloud infrastructure provider service teams can define service features or functionalities of services which they want to expose to operators or end users (e.g., customers) for management or use thereof. A service control policy (SCP) is then used to restrict the availability of those service features to particular operators and customers.

Such a hierarchy reflects a reseller model; wherein for example, at a first or higher-level, a cloud infrastructure provider needs to enable a particular service feature, and then at a second or lower-level an, e.g., realm operator, needs to enable the feature for use by its customers.

Although several of the examples described herein illustrate various systems, methods, and/or techniques as may be used in the context of providing private label cloud (PLC) environments, in accordance with various embodiments, the systems, methods, and techniques described herein can be used, within or with other types of cloud environments.

In accordance with an embodiment, an example process for determining if a service feature is enabled (available) or disabled (unavailable) can include:

If, at a first level of a hierarchy of entities defining the service control policies, a service control policy is found for disabling a particular service feature that matches a particular criteria, then the associated service feature is indicated as disabled or unavailable (for use by, e.g., the requesting cloud infrastructure provider, realm operator, tenant, or customer).

If a service control policy is found for enabling the service feature that matches the criteria, the workflow will continue to scan within the hierarchy of entities defining the service control policies for any policy disabling the service feature that matches the criteria; if none are found, then the associated service feature is indicated as enabled or available.

In accordance with an embodiment, a management user interface or console associated with managing a service provides an adaptive user experience based on assessing the service control policies associated with a particular service or service feature. For example, console interface elements can be removed or greyed-out based on a feature unavailability, as determined by the service control policy.

For example, when a realm operator or customer's environment is accessed via a console for purposes of managing services therein, if a particular service or an associated service feature is disabled or turned off, then its functionality is hidden by the console plugin.

In accordance with an embodiment, the feature management service can determine access by particular operators or users within particular tenancies or regions to particular service features, by assessing a hierarchy of the service control policies and relationships associated with the particular service features and determining a state associated with the service and/or its associated service feature.

As another example, in the case of a data plane service, a determination can be made for a particular tenant or customer (of an operator) whether the data plane service, or one or more associated service features thereof, is enabled for use by the particular tenant or customer.

As another example, in the case of allocating resources to an, e.g., tenant or customer, such as increasing a number of compute units for their use, the feature management service can be used to determine if a particular service feature is enabled for a particular service (e.g., a data plane service), for that tenant or customer, and then, based on the assessed state of that service feature, either approve or refuse the requested operation.

In accordance with an embodiment, various details of particular implementations or embodiments are provided below. The description is provided for the purposes of illustrating the teachings herein; and is not intended to be exhaustive or to limit the scope of protection to the precise forms disclosed. Many modifications and variations will be apparent to the practitioner skilled in the art.

| Term | Description |
|---|---|
| PLC | Private Label Cloud. |
| Feature | Controllable unit of functionality within a service. |
| Console Allowlists | Feature flags stored, for example, inside the limits service, used by console plugins to control the user experience behavior and functionality. |
| SCP | Service Control Policy; a policy to control the availability of the features inside a service. |
| Operator | The different personas that can manage features, for example: a service team, realm operator, and organization or tenancy administrator. The operator will be ordered by priority into multiple levels/layers as such: cloud infrastructure provider service team (higher), real operator, organization, tenancy admin (lower) |
| Realm Operator | Any operator that is responsible for a realm level deployment, for example a PLC operator. |
| Organization | A group of tenancies: one parent and zero-to-many children, with shared usage and unified reporting. |

Figure 11:
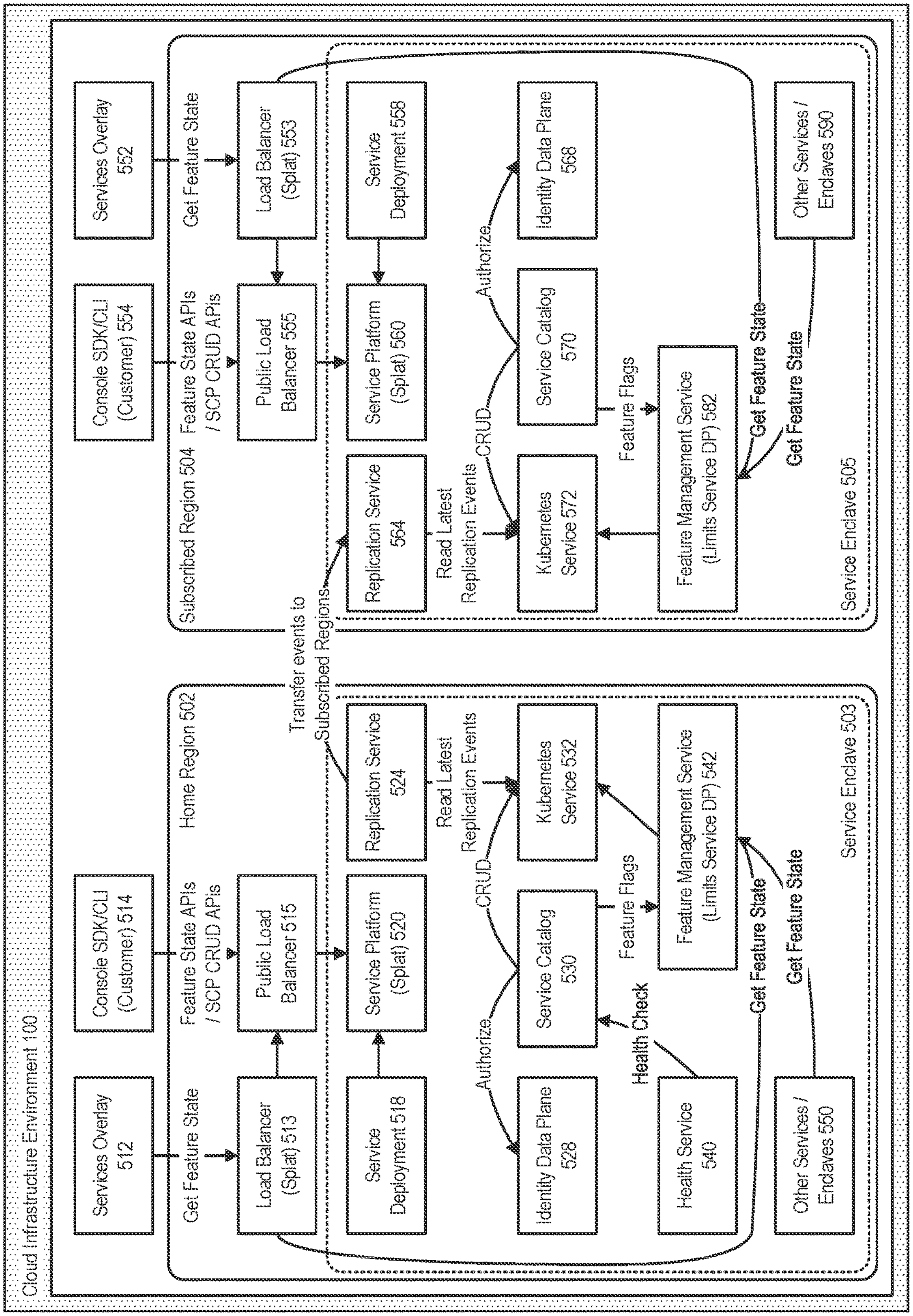
FIG. 11 illustrates an example cloud infrastructure environment that can use service control policies, in accordance with an embodiment.

FIG. 11 illustrates an example cloud infrastructure environment that can use service control policies, in accordance with an embodiment.

As illustrated in FIG. 11, in accordance with an embodiment, and provided by way of example to illustrate the methods described herein, a cloud infrastructure environment can include one or more home region 502 and subscribed region 504, each of which can include a service enclave 503, 505 that provides services and service features.

In accordance with an embodiment, a services overlay 512, 552 allows access to services provided within the cloud infrastructure environment via a load balancer 513, 553 in communication with a service platform 520, 560 (Splat) that implements an internal API gateway, which provides access to services and service features, and provides a feature state for use in processing requests.

In accordance with an embodiment, a console 514, 554, for example a software development kit (SDK) or command line interface (CLI), operated by a customer, can access the services provided within the cloud infrastructure environment and associated service features via a public load balancer 515, 555 and feature state API's that allow create, read, update and delete (CRUD) operations.

In accordance with an embodiment, within a service enclave, the system can include various components that support access to services, including, for example, a service deployment component 518, 558 that provides deployment of services within the cloud infrastructure environment; a replication service 524, 564 that transfer events from the home region to one or more subscribed regions; and an identity data plane 528, 568 that provides authorization of requests. A service catalog 530, 570 (product catalog) operates as a service control repository in storing a definition of the services and service features, together with service control policies or rules that define availability or access to the service features. A Kubernetes or other service 532, 572 operates to maintain the state of the services and service features; while a limits service health component 540 that performs health checks on the service catalog.

In accordance with an embodiment, the feature management service, (which in some embodiments as illustrated below can be provided by a limits service data plane) 542, 582 can operate as described below, for example to provide feature states in response to requests. In accordance with other embodiments, the feature management service can be provided as a separate component. Other services/enclaves 550, 590 can similarly access the limits service data plane (feature management service) to obtain feature states.

The above example is provided for the purposes of illustrating the teachings herein; and is not intended to be exhaustive or to limit the scope of protection to the precise forms disclosed; in accordance with other embodiments other types of architectures can be provided to implement or perform the methods described herein.

Service and Feature States

In accordance with an embodiment, the system comprises a service control repository or service catalog that provides a definition of the services and service features, together with service control policies or rules that define availability or access to the service features. Features can be grouped inside services, and the associated metadata stored inside a service catalog database.

Generally, service and feature definitions are managed by the cloud infrastructure provider's internal service team that owns those services or features. Other operators will not be able to change the definitions for these entities.

In accordance with an embodiment, feature availability operates in the manner of a stream of permissions or approvals, flowing from a higher-level, the internal operator, to the lower-level, the customer. Any operator in the process can choose to stop the flow at their level, which will block it for any other lower-level operators and customers.

In accordance with an embodiment, service features support at least two states: available, wherein the feature is available for the lower-level operator or the users; and unavailable, wherein the feature is hidden from the lower-level operators and users. Additional states that can be supported include, for example, deprecated, or retired. In accordance with an embodiment, the end user or customer will be the one actually using the service features. For other operators, an unavailable feature will mean they will not be able to control it or offer it to their tenancies/customers.

Figure 12:
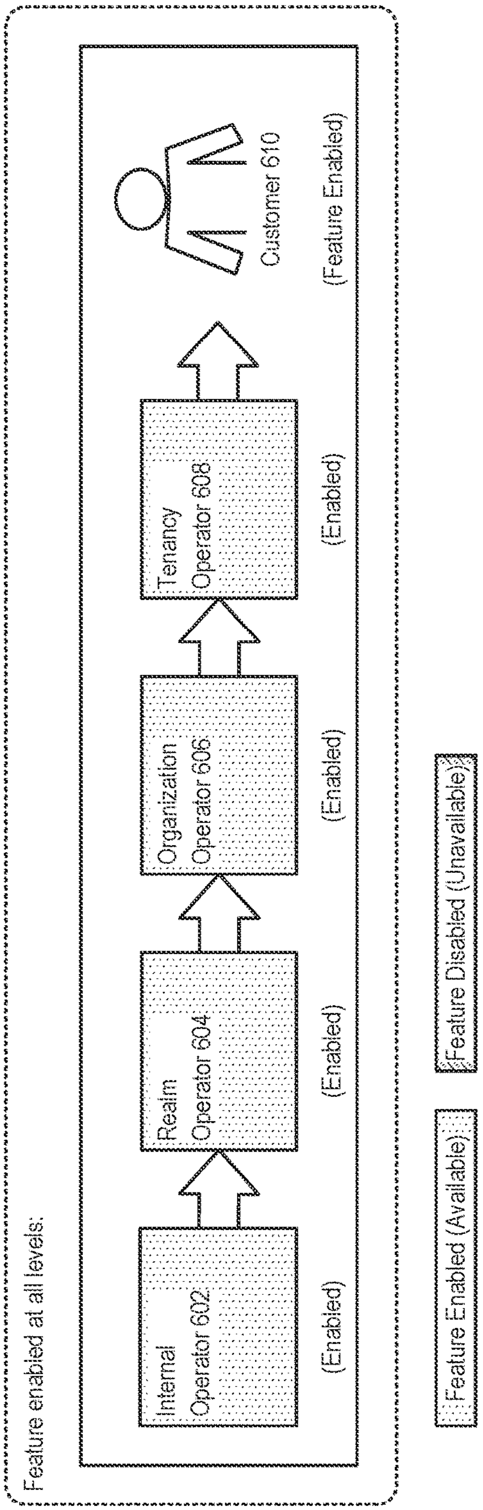
FIG. 12 illustrates how services or service features can be enabled or disabled according to a hierarchy of entities defining the service control policies, in accordance with an embodiment.

FIG. 12 illustrates how services or service features can be enabled or disabled according to a hierarchy of entities defining the service control policies, in accordance with an embodiment.

As illustrated in FIG. 12, in accordance with an embodiment, a hierarchy of entities defining the service control policies or levels includes those provided by an internal operator 602, realm operator 604, organization operator 606, and tenancy operator 608. In the illustrated example, the particular service feature is enabled at all interim levels, rendering the feature enabled for the end user or customer 610.

Figure 13:
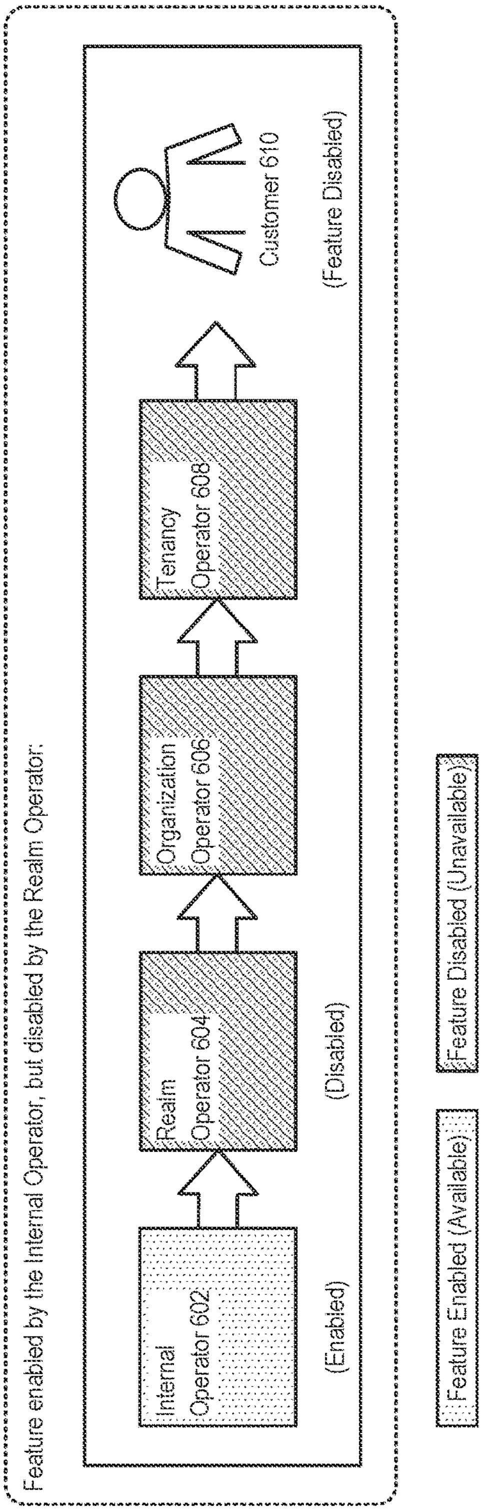
FIG. 13 further illustrates how services or service features can be enabled or disabled according to a hierarchy of entities defining the service control policies, in accordance with an embodiment.

FIG. 13 further illustrates how services or service features can be enabled or disabled according to a hierarchy of entities defining the service control policies, in accordance with an embodiment.

As illustrated in FIG. 13, in accordance with an embodiment, and in the illustrated example, the particular service feature is enabled by the internal operator, but is disabled by the realm operator, rendering the feature disabled for the end user or customer.

In accordance with an embodiment, the use of a hierarchy of service control policies allows the status of a particular service feature to be controlled at multiple levels, each corresponding to a particular operator. At each level within the hierarchy, only the features made available by the higher-level can be controlled as described above. For example, the service control policies created at different levels can be evaluated sequentially starting from those created by the higher-level operator to those created by the tenancy administrators.

Figure 14:
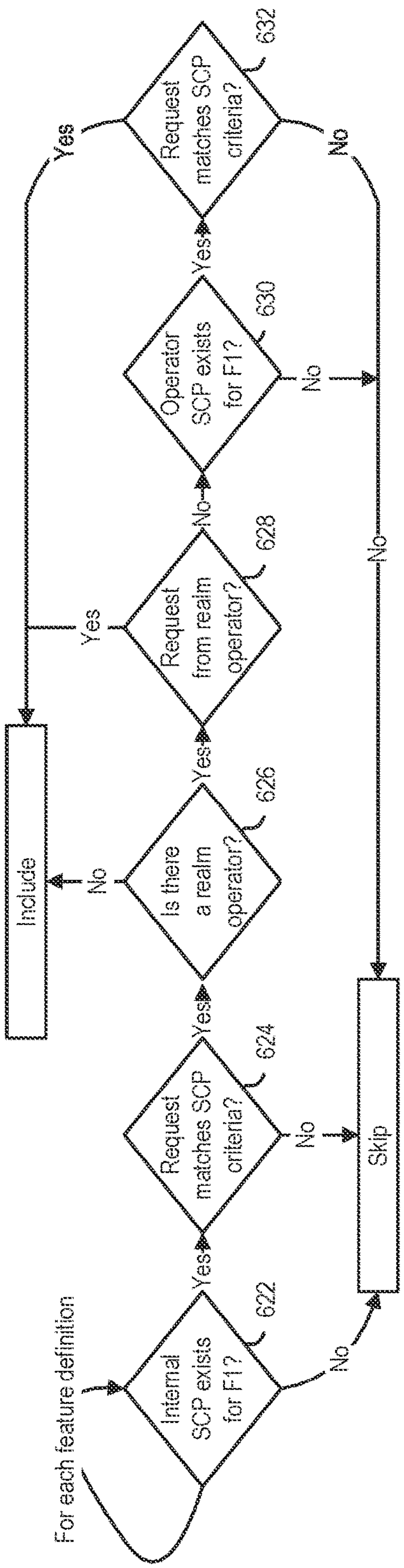
FIG. 14 illustrates a process for use with service control policies to enable or disable availability or access to services or service features, in accordance with an embodiment.

FIG. 14 illustrates a process for use with service control policies to enable or disable availability or access to service features, in accordance with an embodiment.

As illustrated in FIG. 14, in accordance with an embodiment, a process can be used to determine whether a service or feature is to be included in the service catalog and made available to a customer.

For each feature definition, at 622, a determination is made as to whether a service control policy exists for that feature (F1).

If a service control policy exists for the service feature, then, at 624, a determination is made as to whether the request matches the service control policy criteria.

If the request matches the service control policy criteria, then, at 626, a determination is made as to whether there is a realm operator.

If, at 628, the request is determined to be from the realm operator then the service feature definition is included in the service catalog and made available to a customer.

Otherwise, at 630, a determination can be made as to whether an operator service control policy exists for the service feature, and, at 632, whether the request matches the service control policy criteria. If both of these are found to be true, then the service feature definition is included.

Figure 15:
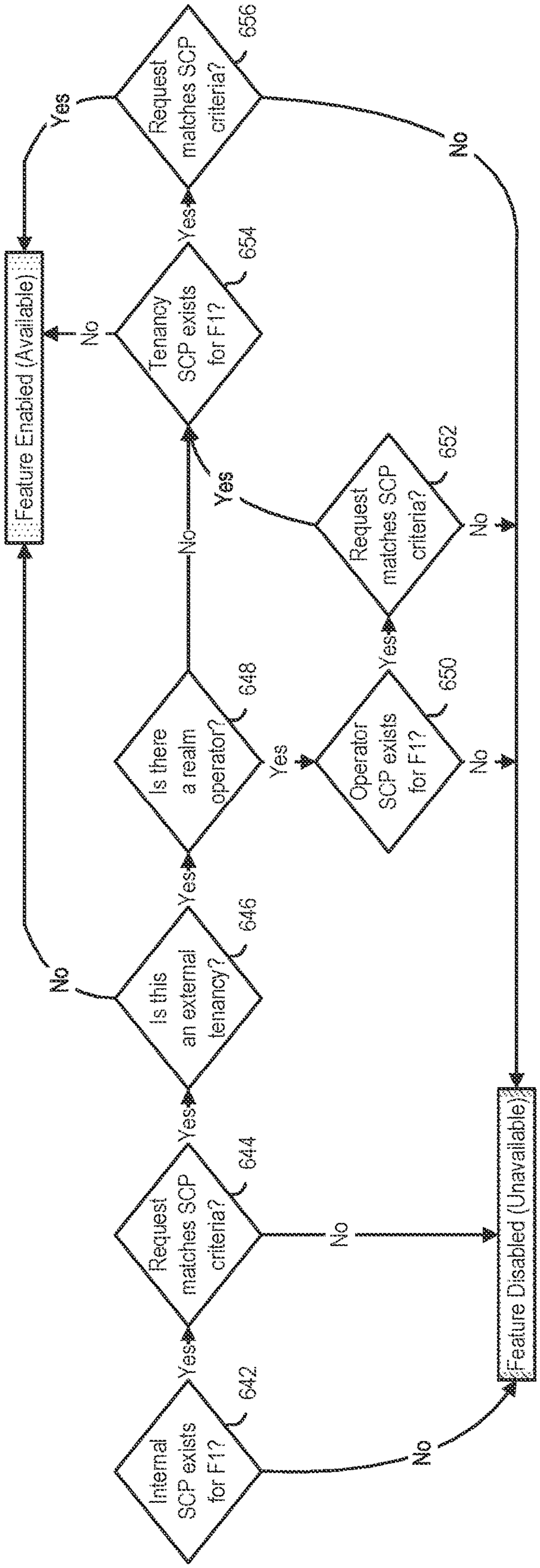
FIG. 15 illustrates another process for use with service control policies to enable or disable availability or access to service features, in accordance with an embodiment.

FIG. 15 illustrates another process for use with service control policies to enable or disable availability or access to service features, in accordance with an embodiment.

As illustrated in FIG. 15, in accordance with an embodiment, a process can be used to determine whether a service or feature is to be enabled or disabled for use by a particular customer.

At 642, a determination is made as to whether an internal service control policy exists for that feature (F1).

If an internal service control policy exists for the service feature, then, at 644 a determination is made as to whether the request matches the service control policy criteria.

At 646, a determination is made as to whether the request is associated with an external tenant, if not the service feature is enabled or made available, and the process ends.

If, at 648, there is a realm operator then, at 650, a determination is made whether an operator service control policy exists for the service feature and, at 652, if the request matches the service control policy criteria.

If both of these are found to be true, then, at 654, a determination is made as to whether a tenancy service control policy exists for the service feature, and, at 656, if the request matches the service control policy criteria, in which case the service feature is enabled.

If at any stage in the process (e.g., at 644, 652, 656) the request does not match the service control policy criteria at that stage, then the service feature is disabled or rendered unavailable.

Internal API for Service and Feature Definition

In accordance with an embodiment, a service platform (Splat) implements an internal API gateway, for providing access to services and service features and a feature state for use in processing requests.

In accordance with an embodiment, the API can be provided as control plane (CP) APIs usable by a cloud infrastructure provider's internal service teams to define and manage their services and service features.

Service Definition

In accordance with an embodiment, an example of various API operations used to define a service are illustrated below:

| Path | Verb | Operation | Parameters | Permission | Details |
|---|---|---|---|---|---|
| /serviceDefinitions | GET | listServiceDefinitions | compartmentId serviceName (optional) | SERVICE_DEFINITION_INSPECT | List all service definitions entities. |
| | POST | createServiceDefinition | serviceName compartmentId description statesBehavior (optional) | SERVICE_DEFINITION_CREATE | Create a service definition entity. |
| /serviceDefinitions /{serviceDefinitionId} | GET | getServiceDefinition | serviceDefinitionId | SERVICE_DEFINITION_READ | Get service definition. |
| | PUT | updateServiceDefinition | serviceDefinitionId | SERVICE_DEFINITION_UPDATE | Update service definition. |
| | DELETE | deleteServiceDefinition | serviceDefinitionId | SERVICE_DEFINITION_DELETE | Delete the service definition. |

In accordance with an embodiment, the above operations can utilize various fields, for example:

| Field | Type | Required | Description |
|---|---|---|---|
| id | String | Yes | Unique identifier. |
| name | String | Yes | The name of the service; identifier type value (no spaces, no special characters); unique across all entities. |
| compartmentId | String | Yes | The compartment ID of the owning team. |
| description | String | Yes | The description of the service. |
| statesBehavior | String | No | JSON map of the behavior associated with each state. |

Feature Definition

In accordance with an embodiment, an example of various API operations used to define a service feature are illustrated below:

| Path | Verb | Operation | Parameters | Permission | Details |
|---|---|---|---|---|---|
| /featureDefinitions | GET | listFeatureDefinitions | compartmentId serviceName (optional) | FEATURE_DEFINITION_INSPECT | List all feature definitions entities. |
| | POST | create FeatureDefinition | serviceName featureName compartmentId description forceAvailable limits statesBehavior | FEATURE_DEFINITION_CREATE | Create a feature service definition entity. |
| /features Definitions /{featureDefinitionId} | GET | getFeatureDefinition | featureDefinitionId | FEATURE_DEFINITION_READ | Get feature definition. |
| | PUT | updateFeatureDefinition | feature DefinitionId | FEATURE_DEFINITION_UPDATE | Update feature definition. |
| | DELETE | deleteFeatureDefinition | feature DefinitionId | FEATURE_DEFI NITION_DELETE | Delete the feature definition. |

In accordance with an embodiment, the above operations can utilize various fields, for example:

| Field | Type | Required | Description |
|---|---|---|---|
| id | String | Yes | Unique identifier |
| name | String | Yes | The name of the feature; identifier type value (no spaces, no special characters); unique inside a service. |
| serviceName | String | Yes | The service associated with the feature; must be a valid serviceName with an existing ServiceDefinition. |
| compartmentId | String | Yes | The compartment ID of the owning team; might be different than the ServiceDefinition compartmentId. |
| description | String | Yes | The description of the feature. |
| forceAvailable | Boolean | Yes | Forces the feature to be available by default for all lower-levels. |
| limits | String | False | JSON list of public limits associated with the service/feature/product. |
| internalOnly | Boolean | Yes | Set to true for features that a cloud infrastructure provider's internal service teams do not want to be exposed to lower-level operators. |
| statesBehavior | String | False | JSON map of what each state should affect the linked entities. |

In accordance with an embodiment, a states Behavior field can be provided as an optional field that will store any special behavior that maps to the states associated with a particular service or service feature, for example:

| Field | Type | Required | Description | Example |
|---|---|---|---|---|
| State | ENUM | True | The state covered by this entry. | AVAILABLE |
| console-Behavior | ENUM | True | Overwrite the default console behavior associated with the state. | HIDDEN |

In accordance with an embodiment, a cloud infrastructure provider's internal service teams can use an API to evaluate a particular feature, for example:

| Path | Verb | Operation | Parameters | Details |
|---|---|---|---|---|
| /features/evaluate | POST | evaluate-Features | Payload<br>serviceName<br>list of featureNames<br>tenancyId<br>region<br>ad | Evaluate the corresponding features. |

In accordance with an embodiment, a cloud infrastructure provider's internal service teams can use an API to get the state of a particular feature, for example by realm or region, for example

| Path | Verb | Operation | Parameters |
|---|---|---|---|
| /features/state/service/{serviceName}/feature/{featureName}/tag/{tag} | GET | getFeature-StateForRealm | serviceName<br>featureName<br>tag |
| /features/state/service/{serviceName}/feature/{featureName}/tag/{tag}/region/{region} | GET | getFeature-StateForRegion | serviceName<br>featureName<br>tag<br>region |
| /features/state/service/{serviceName}/feature/{featureName}/tag/{tag}/region/{region}/ad/{ad} | GET | getFeature-StateForAd | serviceName<br>featureName<br>tag<br>region<br>ad |

In accordance with an embodiment, an API can be provided that allows a console to get a list of all disabled features for a particular tenancy and attributes, for example:

| Path | Verb | Operation | Parameters | Details |
|---|---|---|---|---|
| /features/console/{compartmentId} | GET | getFeaturesStatesForConsole | compartmentId | Return all the disabled features and services for the target tenancy. |

In accordance with an embodiment, other APIs can be provided to expose available services and service features for control by different operators, for example:

| Path | Verb | Operation | Parameters | Permission | Details |
|---|---|---|---|---|---|
| /services | GET | listServices | compartmentId serviceName (optional) | SERVICE_CATALOG_INSPECT | List all the services available. This will be used by the operator UI. |
| /features | GET | listFeatures | compartmentId serviceName featureName (optional) | SERVICE_CATALOG_INSPECT | List all the features available. This will be used by the operator UI. |

In accordance with an embodiment, the following rules apply when service control policy statements are evaluated: within a service control policy, statements are evaluated in order, and later statements supersede previous statements that target the same feature. In cases where more than one policy is set for the same resource, the most restrictive policy is applied (e.g., a policy to disable a particular service feature takes precedence over a policy to enable that service feature).

Figure 16:
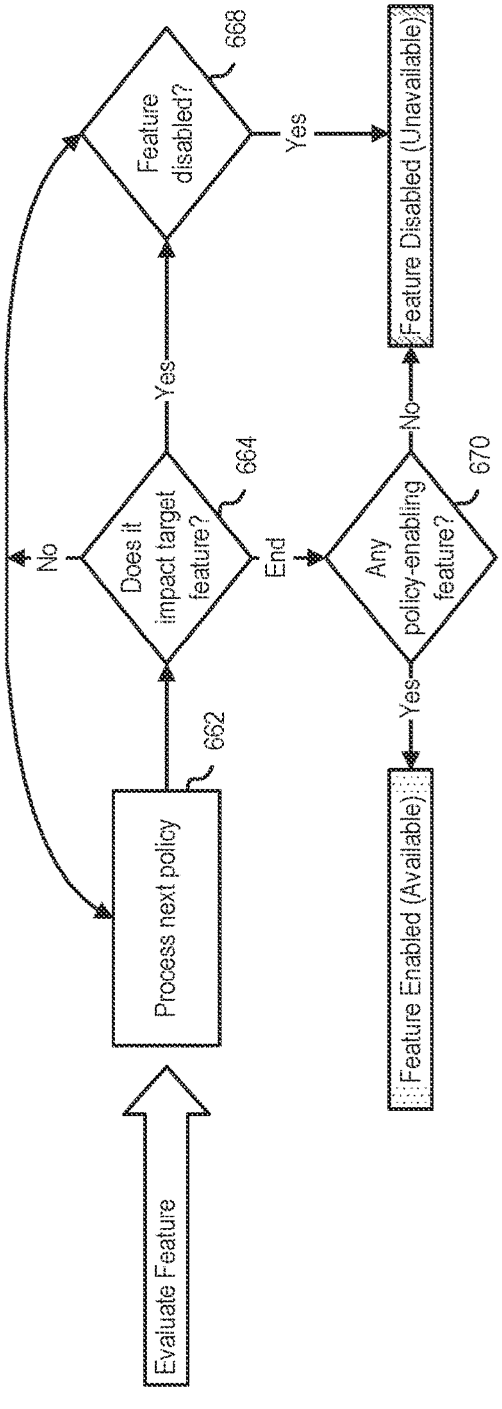
FIG. 16 illustrates another process for use with service control policies to enable or disable availability or access to service features, in accordance with an embodiment.

FIG. 16 illustrates another process for use with service control policies to enable or disable availability or access to service features, in accordance with an embodiment.

As illustrated in FIG. 16, in accordance with an embodiment, a process for evaluating the status of a service or feature can include, at 662, processing the (next) service control policy associated with the service or feature, and, at 664, determining whether that policy impacts the target feature.

If, at 668, a service control policy is found for disabling the service feature that matches the criteria, the result will be that the feature is disabled or rendered unavailable according to the policy.

If, at 670, a service control policy is found for enabling the service feature that matches the criteria, the workflow will continue to scan for any policy disabling the feature that matches the criteria. If none are found, then the service feature can be enabled or rendered available.

State Transitions

Figure 17:
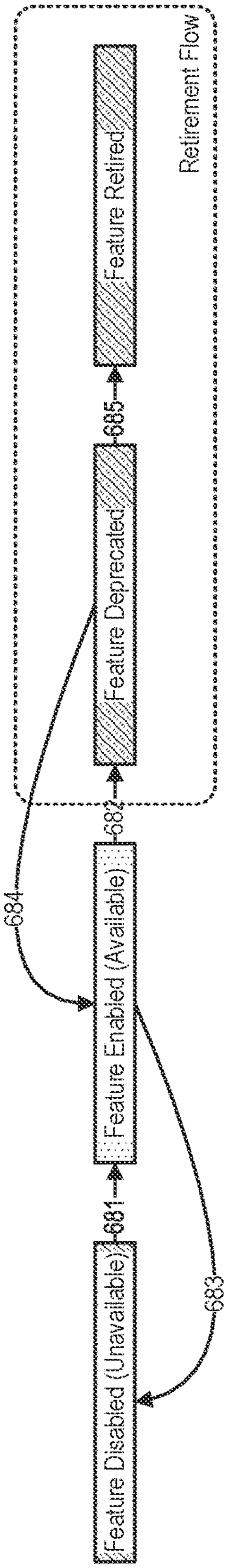
FIG. 17 illustrates how a hierarchy of entities defining the service control policies can be used to indicate services or service features as enabled, disabled, deprecated, or retired, in accordance with an embodiment.

FIG. 17 illustrates how a hierarchy of entities defining the service control policies can be used to indicate services or service features as enabled, disabled, deprecated, or retired, in accordance with an embodiment.

As illustrated in FIG. 17, in accordance with an embodiment, a feature status can be transitioned, at 681, from disabled to enabled; or, at 682, from enabled to deprecated. Similarly a previously-enabled feature can be transitioned, at 683, from enabled to disabled. A deprecated service feature can, at 684, be enabled if appropriate; or at 685, transitioned from a deprecated state to a retired state as part of a feature retirement flow.

In accordance with an embodiment, transitioning from unavailable to available will have a similar impact to releasing a feature from the customer's point of view.

However, marking a feature that is already available, and in use, as unavailable introduces some complexities: for example, users should still have access to their existing resources; users should not be able to create new resources; users would still need to have access to the appropriate console plugin to manage their existing resources.

As another example, users with no usage should not see the console plugin at all. Considering this, a service feature that has already been marked as available cannot be made unavailable; if operators want to mark the feature as being unavailable, they can use a feature retirement flow. The supported states will translate to the following API and console behavior for the operator:

| State | API Behavior | Operator UI |
|---|---|---|
| Unavailable | The operator cannot create policies for the feature. | The operator cannot see the feature in the UI. |
| Available | The operator can create policies for the feature. | The operator can see the feature in the UI. |

In accordance with an embodiment, the supported states will translate to the following API and console behavior for the end user:

| State | API Behavior | User Console Behavior | Console State |
|---|---|---|---|
| Unavailable | All API operations are blocked | The user cannot see the feature in the console. | HIDDEN |
| Available | All API operations are allowed | The user can see the feature and use it. | VISIBLE |
| Deprecated | Create operation is blocked | The user can still see the normal UI, but elements relating to the create workflow are disabled. | UPDATE_ONLY |
| Retired | All API operations are blocked | The user cannot see the feature in the console and cannot access the APIs. | HIDDEN |

Use of Service Control Policies

FIGS. 18-21 illustrate an example use of service control policies within a cloud infrastructure environment, in accordance with an embodiment.

Figure 18:
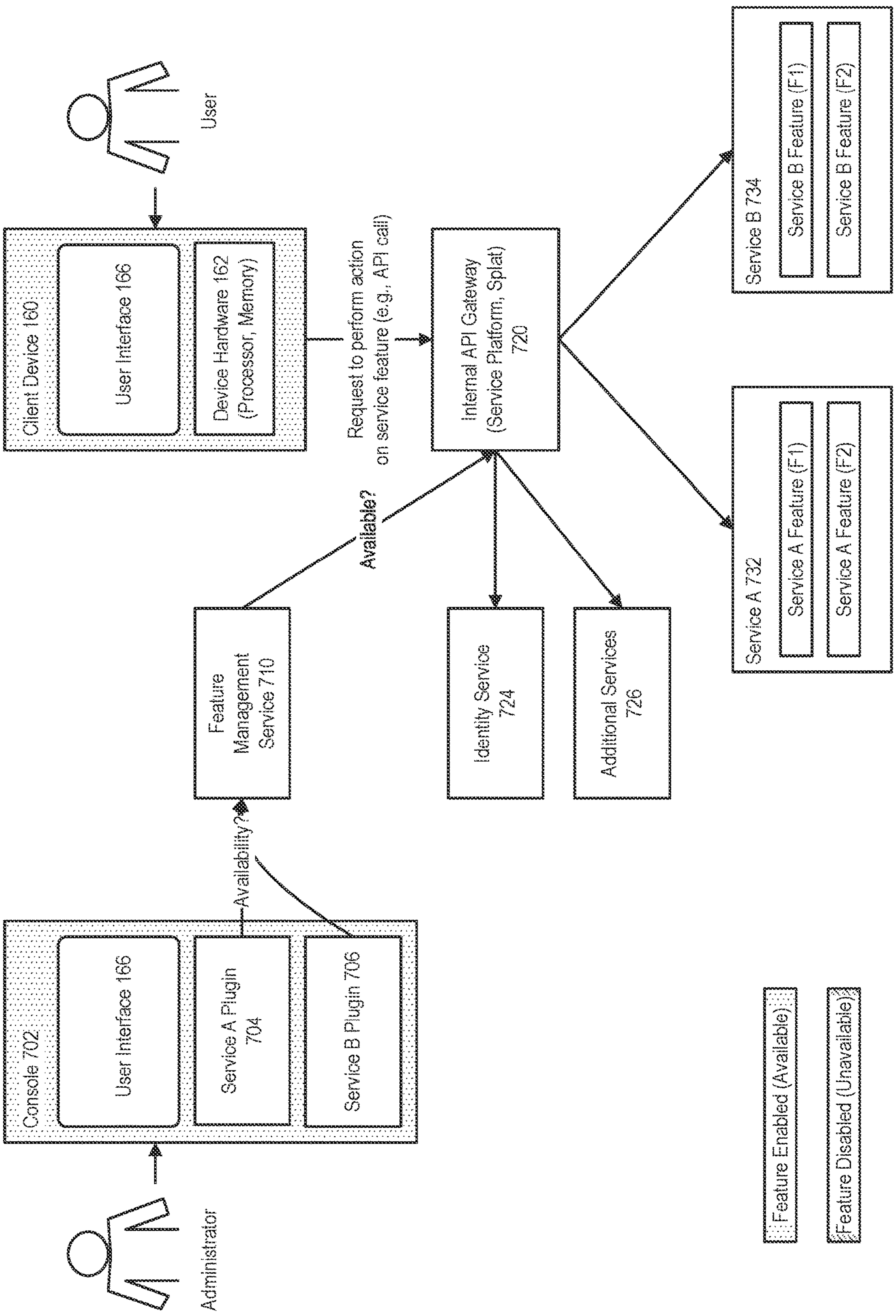
FIG. 18 illustrates an example use of service control policies within a cloud infrastructure environment, in accordance with an embodiment.

As illustrated in FIG. 18, in accordance with an embodiment, a console 702 can include the use of one or more plugins that are associated with managing or using services or service features. In the illustrated example, a service A plugin 704 and service B plugin 706 can be associated with a respective service A 732 and service B 734, for purposes of managing those services or service features associated therewith.

In accordance with an embodiment, a feature management service 710 communicates with an internal API gateway 720 (for example as provided by a service platform, Splat, as illustrated above) that operates to receive requests, for example from clients devices or users to define availability or access to services or the features associated therewith; and provides availability information for use by the console plugins.

In accordance with an embodiment, the system can use other services, for example an identity service 724, or additional services 726 as appropriate, for example to determine information associated with the request such as a user, customer, compartment, or tenancy associated with the request.

Figure 19:
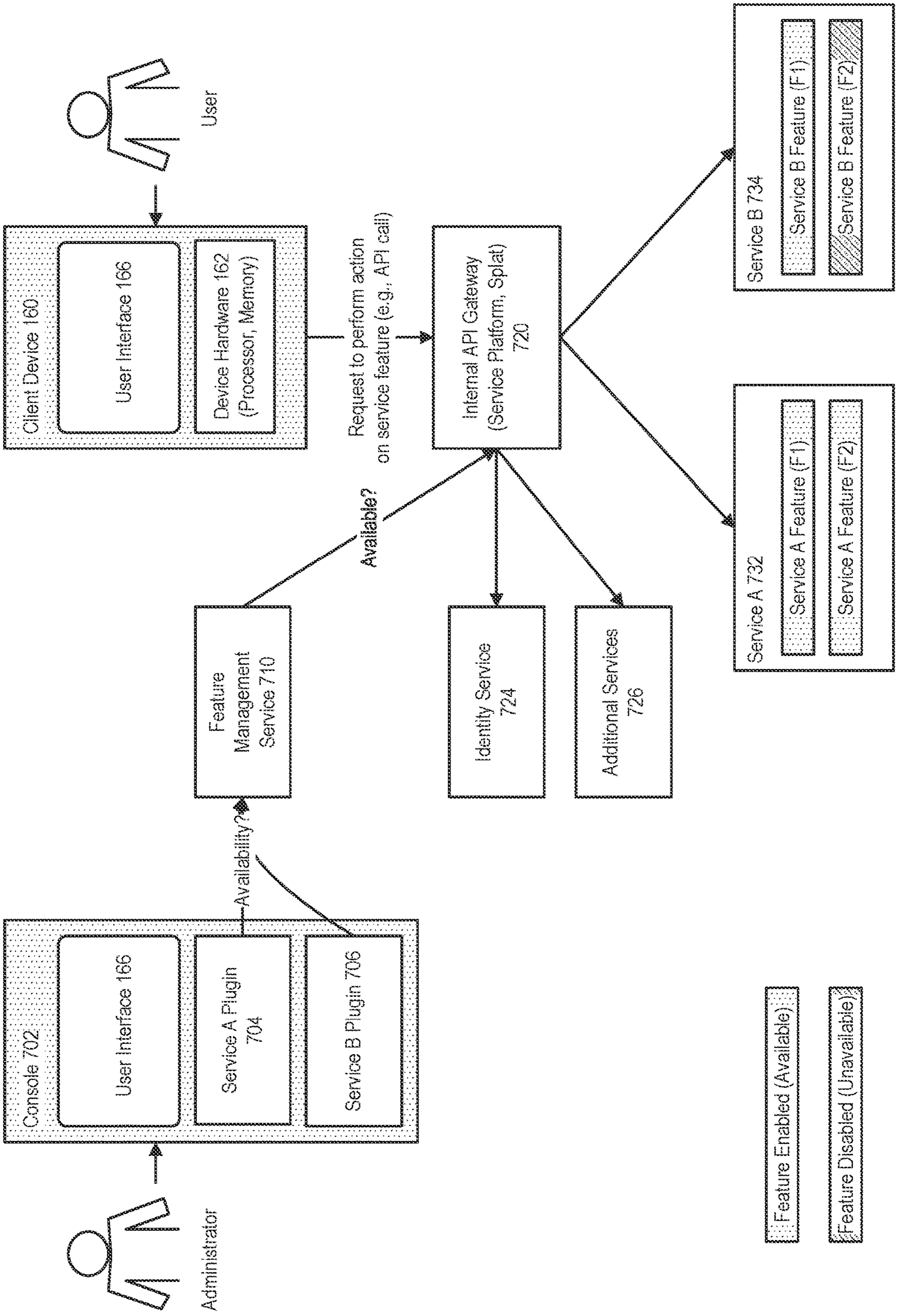
FIG. 19 further illustrates an example use of service control policies within a cloud infrastructure environment, in accordance with an embodiment.

As illustrated in FIG. 19, in accordance with an embodiment, in the example illustrated, the feature management service in communication with the internal API gateway can determine, for example in response to a request, that for service A both of service features F1 and F2 are enabled or available; while for service B, feature F1 is enabled, and feature F2 is disabled for that request.

Figure 20:
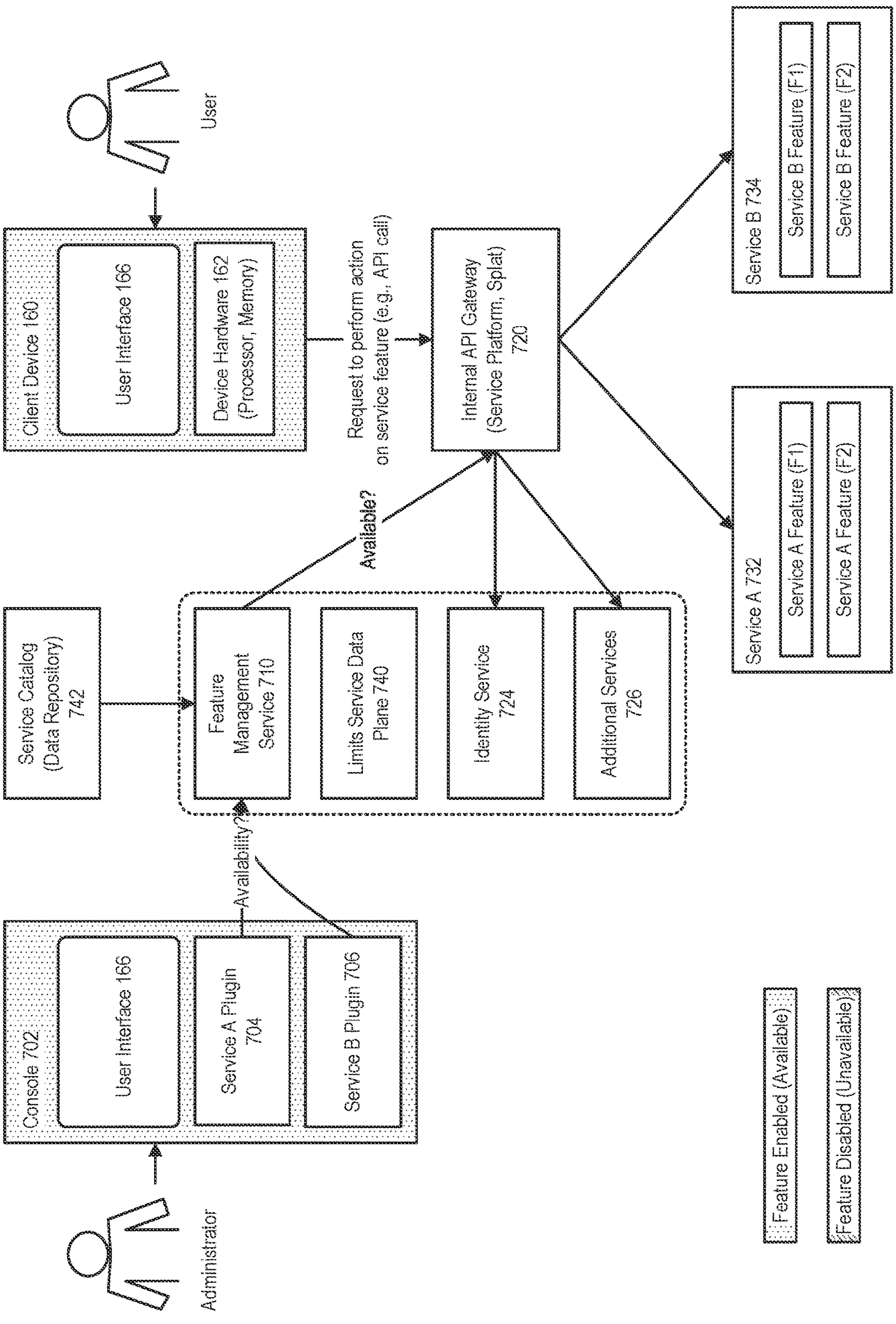
FIG. 20 further illustrates an example use of service control policies within a cloud infrastructure environment, in accordance with an embodiment.

As illustrated in FIG. 20, in accordance with an embodiment, to perform its functionality, the feature management service can utilize a limits service data plane 740, that receives and processes requests, and a service catalog 742 (data repository) that provides a definition of the services and service features, together with service control policies or rules that define availability or access to the service features.

Figure 21:
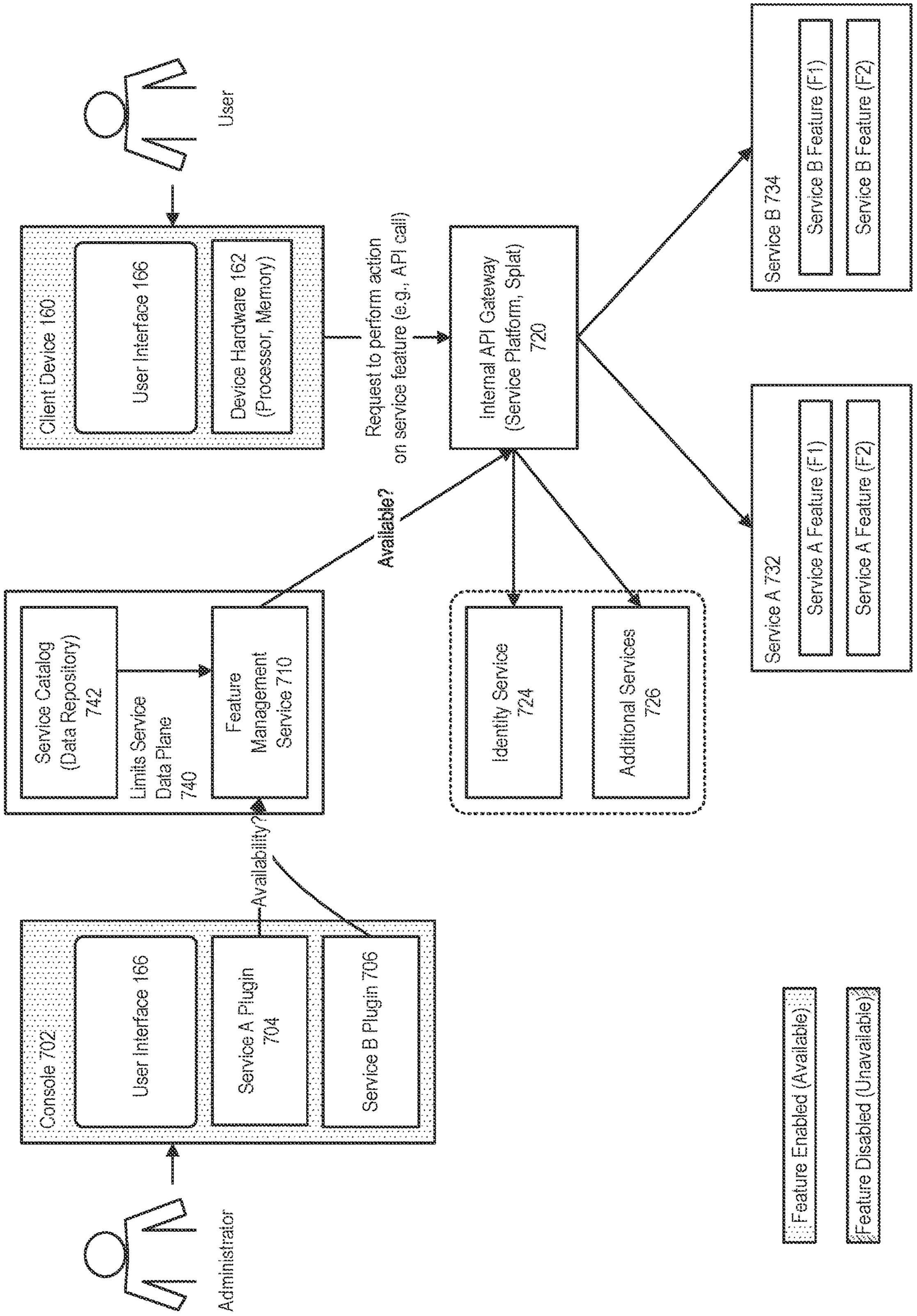
FIG. 21 further illustrates an example use of service control policies within a cloud infrastructure environment, in accordance with an embodiment.

As illustrated in FIG. 21, in accordance with an embodiment, an existing limits service data plane can be modified to include the functionality of the feature management service and/or service catalog, for example to provide feature states in response to requests. In accordance with other embodiments, the feature management service can be provided as a separate component.

The above example is provided for the purposes of illustrating the teachings herein; and is not intended to be exhaustive or to limit the scope of protection to the precise forms disclosed; in accordance with other embodiments other types of processes or components can be provided to implement or perform the methods described herein.

Figure 22:
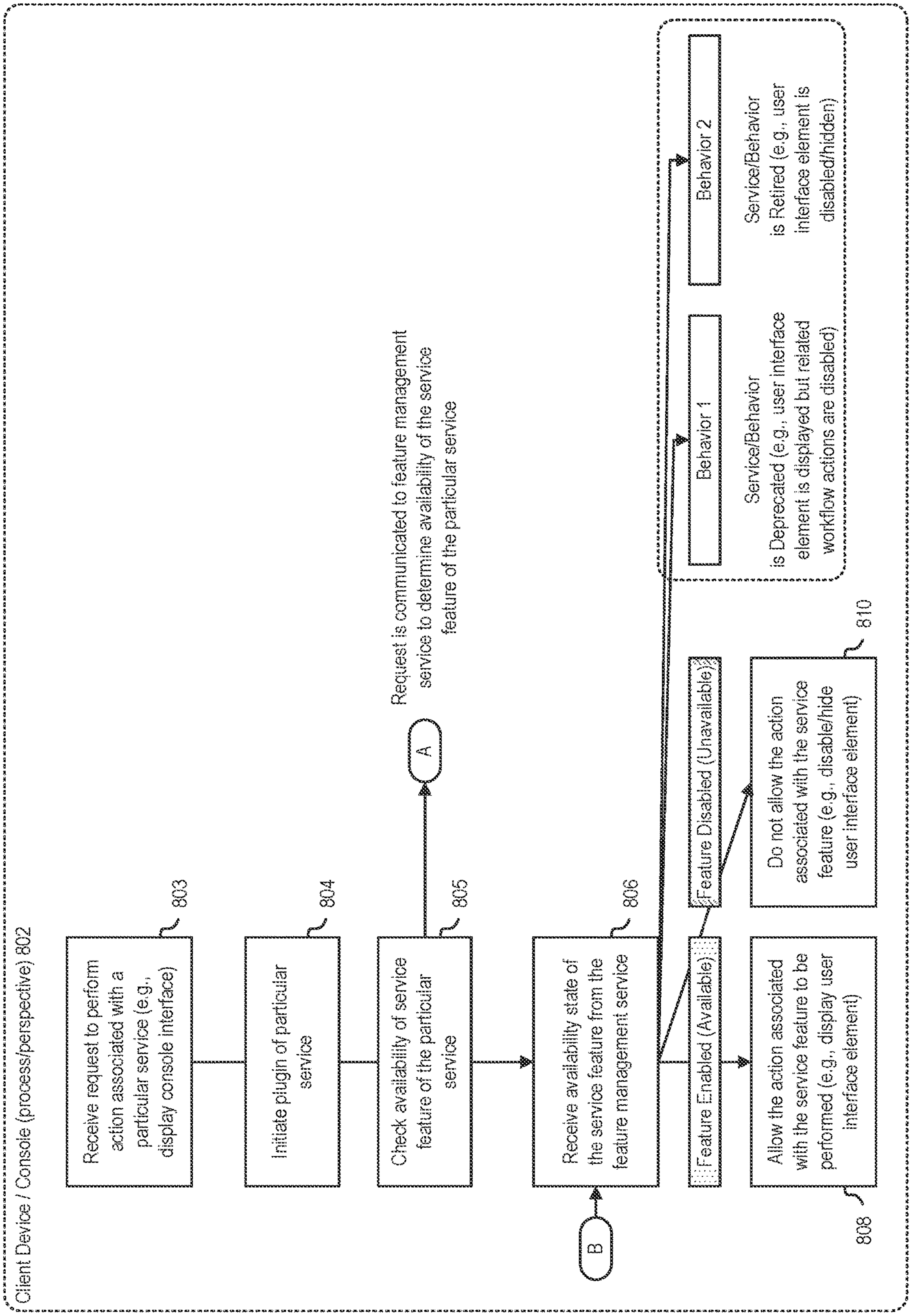
FIG. 22 illustrates a process of using service control policies to enable or disable availability or access to service features, from a perspective of a client device or console, in accordance with an embodiment.

FIG. 22 illustrates a process of using service control policies to enable or disable availability or access to service features, from a perspective of a client device or console, in accordance with an embodiment.

In accordance with an embodiment, the process comprises providing, within a cloud infrastructure environment, a plurality of services for use by operators and tenants or users thereof; providing, within a service control repository, a plurality of service control policies or rules that define access to the services and service features; determining, in response to a request for access by a particular operator or tenant thereof to a particular service feature, by assessing the service control policies, a state associated with the service feature, indicative of its availability to the operator or tenant; and, in response to determining the state associated with the service feature, one of providing or restricting access by the particular operator or tenant thereof to the particular service feature.

For example, as illustrated in FIG. 22, in accordance with an embodiment, and from the perspective of a client device 802, the process can include, at 803, receiving a request to perform an action associated with a service feature of a particular service (e.g., displaying a console interface).

At 804, a console plugin associated with a particular service can be initiated.

At 805, the process includes communicating with a feature management service to determine the availability of a service feature of the particular service.

At 806, the process includes receiving an availability state of the service feature from the feature management service.

Depending on the information received from the feature management service as to the state of the feature being either enabled (available), or disabled (unavailable), then the process proceeds, at 808, to allow the action associated with the service feature to be performed (e.g., to display the user interface element associated with the service feature); or alternatively, at 810, to not allow the action associated with the service feature (e.g., by disabling/hiding the user interface element associated with the service feature).

As illustrated in FIG. 22, in accordance with an embodiment, additional states that can be associated with service features or behaviors can include, for example, deprecated, or retired. For example, in the case of a deprecated service, the associated user interface element may be displayed in the console, but certain workflow operations may be disabled; while in the case of a retired service, the associated user interface element may be disabled/hidden, such that a user cannot see the feature in the console and cannot access the APIs associated with the service.

In accordance with an embodiment, the service control policies can be defined by a policy language which allows definition of (a) a service, (b) one or more service features associated with the service, and (c) one or more policies that enable or disable access to the service features. An example of the use of a policy language is described in further detail below.

In accordance with an embodiment, the feature management service determines in real time the state associated with the service feature based on the service control policies associated with the service, and an indication of a requesting operator or user.

In accordance with an embodiment, the service control policies are managed within a hierarchy of service control policies arranged as multiple levels, wherein at each level within the hierarchy of service control policies only the service features that have been made available by a higher-level entity can be controlled.

In accordance with an embodiment, the feature management service determines the state associated with the service feature by assessing a hierarchy of service control policies and relationships between the service control policies, including, within the hierarchy of service control policies, a first or higher-level of service control policies that defines a set of service features for which availability or access can be controlled by a second or lower-level of service control policies, and wherein the second or lower-level of service control policies control access to the set of service features in response to a request to access the service features.

In accordance with an embodiment, the hierarchy of service control policies includes, at the first or higher-level, one or more cloud infrastructure provider policies associated with a particular service feature, and, at the second or lower-level, one or more realm operator policies associated with the particular service feature that determine access by the operators to its tenants or users thereof.

In accordance with an embodiment, the hierarchy of service control policies includes the first or higher-level of service control policies and the second or lower-level of service control policies; wherein a service control policy provided at the first or higher-level, that defines availability or access to a particular service, allows a service control policy provided at the second or lower-level to control access to a subset of service features associated with the particular service.

In accordance with an embodiment, the first or higher-level of service control policies are cloud infrastructure provider policies associated with a particular service and associated service features, and the second or lower-level of service control policies are realm operator policies associated with the particular service and associated service features and are used to control access by tenants to the subset of service features.

In accordance with an embodiment, the management user interface or console associated with managing a service provides an adaptive user experience based on assessing the service control policy, including that console interface elements can be removed or otherwise indicated based on a feature unavailability, as determined by the service control policy.

In accordance with an embodiment, an operator can create and deploy a service control policy, to restrict the availability of services/features defined by the service control policy across an operator realm (e.g., a PLC realm).

In accordance with an embodiment, the process comprises receiving, by a feature management service, a request to determine an availability state of a service feature of a service to a lower-level of an operator hierarchy; and identifying a set of service control policies, wherein the set of service control policies comprises (a) a first subset of service control policies that are configured from an intermediate-level of the operator hierarchy and (b) a second subset of service control policies that are configured from a higher-level of the operator hierarchy, wherein the lower-level is directly below the intermediate-level in the operator hierarchy, and the intermediate-level is directly below the higher-level in the operator hierarchy In accordance with an embodiment, the process further comprises determining that the first subset of service control policies are configured from the intermediate-level of the operator hierarchy that is directly above the lower-level of the operator hierarchy; evaluating one or more of the first subset of service control policies to determine the availability state of the service feature of the service to the lower-level of the operator hierarchy; and performing one or more of enforcing a behavior responsive to a call made to the service feature from the lower-level of the operator hierarchy based on the availability state of the service feature to the lower-level of the operator hierarchy; and/or causing display or hiding of a console plugin corresponding to the service feature within a console for the lower-level of the operator hierarchy based on the availability state of the service feature to the lower-level of the operator hierarchy.

In accordance with an embodiment, the set of possible values for the availability state comprises available and unavailable; the behavior responsive to the call made to the service feature from the lower-level of the operator hierarchy comprises refraining from prohibiting the call to be made if the availability state is available; the behavior responsive to the call made to the service feature from the lower-level of the operator hierarchy comprises prohibiting the call from being made if the availability state is unavailable.

In accordance with an embodiment, the call made to the service feature is allowed if at least (a) the feature management service refrains from prohibiting the call based on the availability state being available; and (b) an identity service allows access to the service feature based on one or more access policies.

In accordance with an embodiment, at least one of the set of service control policies is directed to the service feature, and the access policies cannot be directed to any service feature of any service.

In accordance with an embodiment, the set of possible values for the availability state further comprises deprecated and retired; the behavior responsive to the call made to the service feature from the lower-level of the operator hierarchy comprises displaying a blank indicator if the availability state is deprecated; the behavior responsive to the call made to the service feature from the lower-level of the operator hierarchy comprises displaying a blank indicator if the availability state is retired.

In accordance with an embodiment, the causing the display or hiding of the console plugin corresponding to the service feature within the console for the lower-level of the operator hierarchy based on the availability state of the service feature to the lower-level of the operator hierarchy comprises transmitting the availability state of the service feature to the console, wherein the console displays or hides the console plugin based on the availability state of the service feature.

In accordance with an embodiment, the evaluating the one or more of the first subset of service control policies to determine the availability state of the service feature of the service to the lower-level of the operator hierarchy comprises determining that the availability state is unavailable if at least one of the first subset of service control policies indicates disabling the service feature to the lower-level of the operator hierarchy.

In accordance with an embodiment, the evaluating the one or more of the first subset of service control policies to determine the availability state of the service feature of the service to the lower-level of the operator hierarchy comprises determining that the availability state is unavailable if none of the first subset of service control policies indicates enabling the service feature to the lower-level of the operator hierarchy.

In accordance with an embodiment, the evaluating the one or more of the first subset of service control policies to determine the availability state of the service feature of the service to the lower-level of the operator hierarchy comprises determining that the availability state is available if none of the first subset of service control policies indicates disabling the service feature to the lower-level of the operator hierarchy and at least one of the first subset of service control policies indicates enabling the service feature to the lower-level of the operator hierarchy.

In accordance with an embodiment, the service or service feature is accessed at an endpoint of an internal API gateway.

In accordance with an embodiment, the lower-level of the operator hierarchy comprises a customer; the intermediate-level of the operator hierarchy comprises a tenant; and the higher-level of the operator hierarchy comprises a cloud service provider.

In accordance with an embodiment, the lower-level of the operator hierarchy comprises a child tenancy; the intermediate-level of the operator hierarchy comprises a parent tenancy; and the higher-level of the operator hierarchy comprises a cloud service provider.

Figure 23:
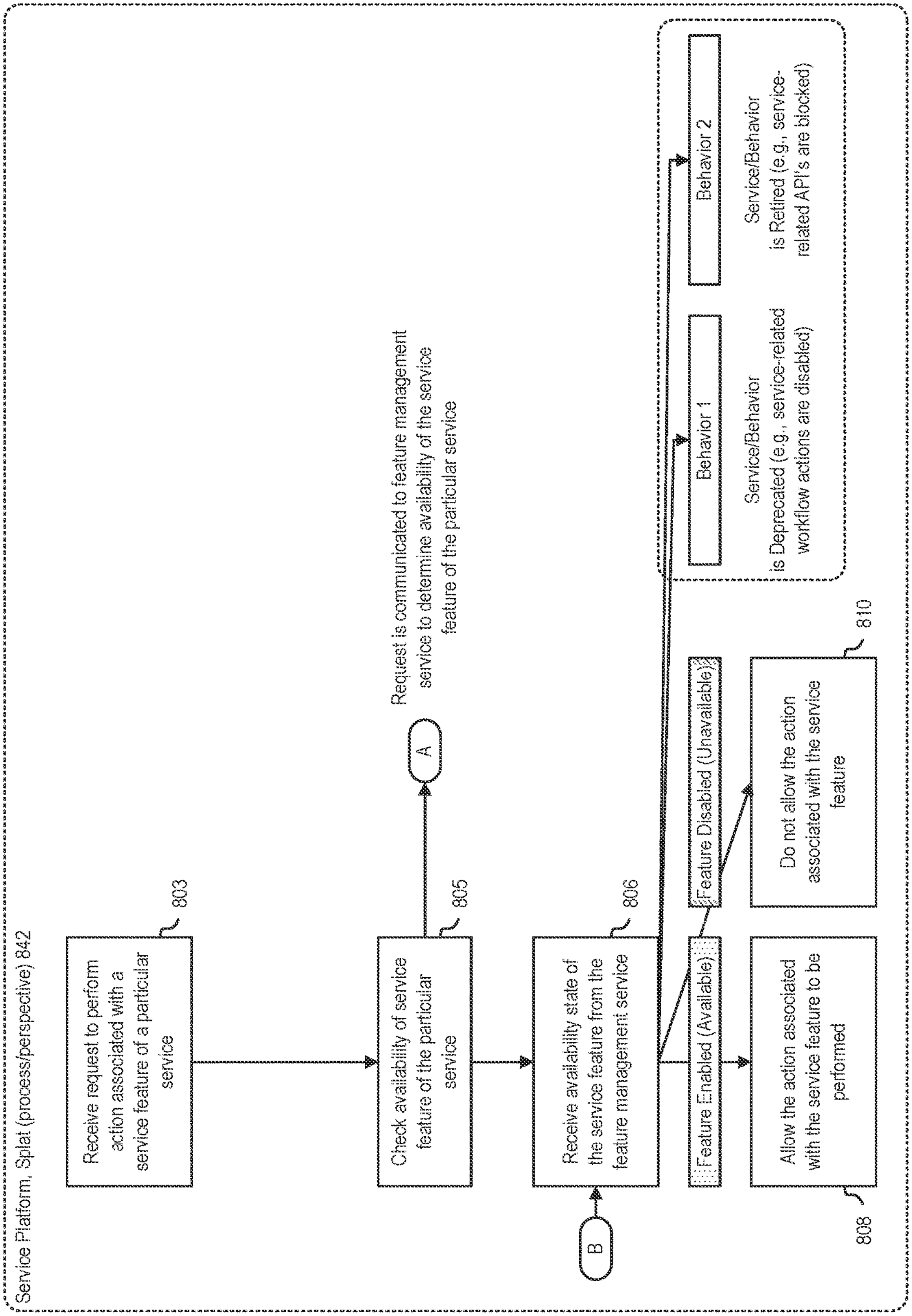
FIG. 23 illustrates a process of using service control policies to enable or disable availability or access to service features, from a perspective of a service platform, in accordance with an embodiment.

FIG. 23 illustrates a process of using service control policies to enable or disable availability or access to service features, from a perspective of a service platform, in accordance with an embodiment.

As illustrated in FIG. 23, in accordance with an embodiment, and from the perspective of a service platform 842, the process can operates as generally described above, for example to receiving a request to perform an action associated with a service feature of a particular service; communicating with a feature management service to determine the availability of a service feature of the particular service; and depending on the information received from the feature management service as to the state of the feature being either enabled (available), or disabled (unavailable), either allowing the action associated with the service feature to be performed (e.g., displaying a user interface element corresponding to the service feature within a console); or alternatively, not allowing the action associated with the service feature (e.g. disabling or hiding the user interface element corresponding to the service feature).

Figure 24:
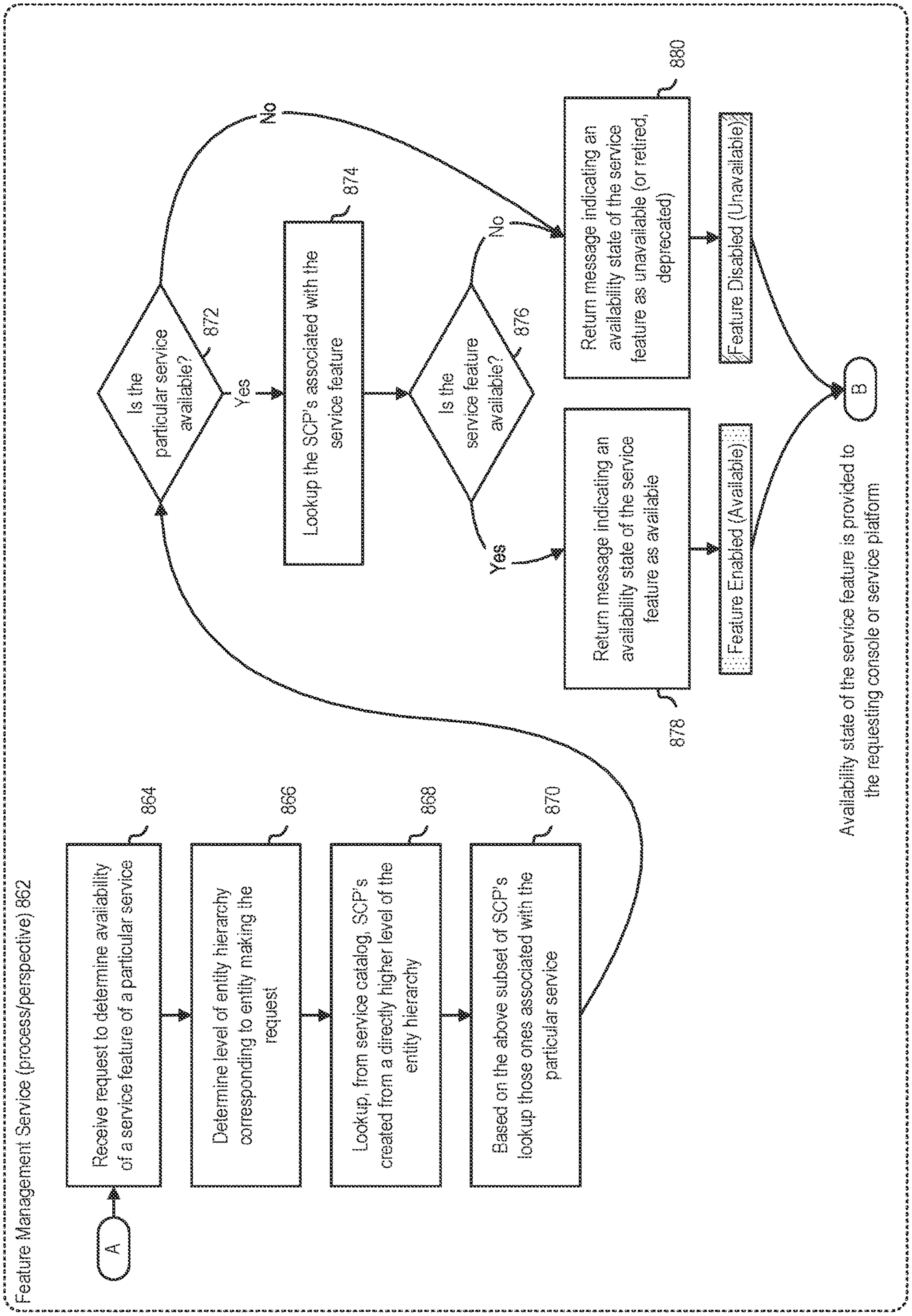
FIG. 24 illustrates a process of using service control policies to enable or disable availability or access to service features, from a perspective of a feature management service, in accordance with an embodiment.

FIG. 24 illustrates a process of using service control policies to enable or disable availability or access to service features, from a perspective of a feature management service, in accordance with an embodiment.

As illustrated in FIG. 24, in accordance with an embodiment, and from the perspective of a feature management service 862, the process can include, at 864, receiving a request to determine the availability of a service feature of a particular service (as illustrated at (A) in FIGS. 22-23 described above); at 866, determining a level of entity hierarchy corresponding to the entity making the request; at 868, performing a lookup, from the service catalog, for service control policies created from a directly higher-level of the entity hierarchy; and, at 870, based on the above subset of service control policies, performing a lookup for those associated with the particular service.

At 872, a determination is made as to whether the particular service is available. If so then the process proceeds, at 874, to lookup the service control policies associated with the service feature.

At 876, a determination is made as to whether the service feature is available. If so then the process proceeds, at 878, to return a message indicating an availability state of the service feature as enabled or available.

Otherwise at 880, a return message is provided indicating an availability state of the service feature as disabled unavailable (or retired, deprecated). In accordance with an embodiment, the availability state of the service feature is provided to the requesting console or service platform (as illustrated at (B) in FIGS. 22-23 described above).

User Interface

In accordance with an embodiment, the system can include a management user interface or console associated with managing a service provides an adaptive user experience based on assessing the service control policies associated with a particular service or service feature. For example, console interface elements can be removed or greyed-out based on a feature unavailability, as determined by the service control policy. The console user interface allows different operators to view the current state of services and service features, from their perspective or in accordance with their permission level.

Figure 25:
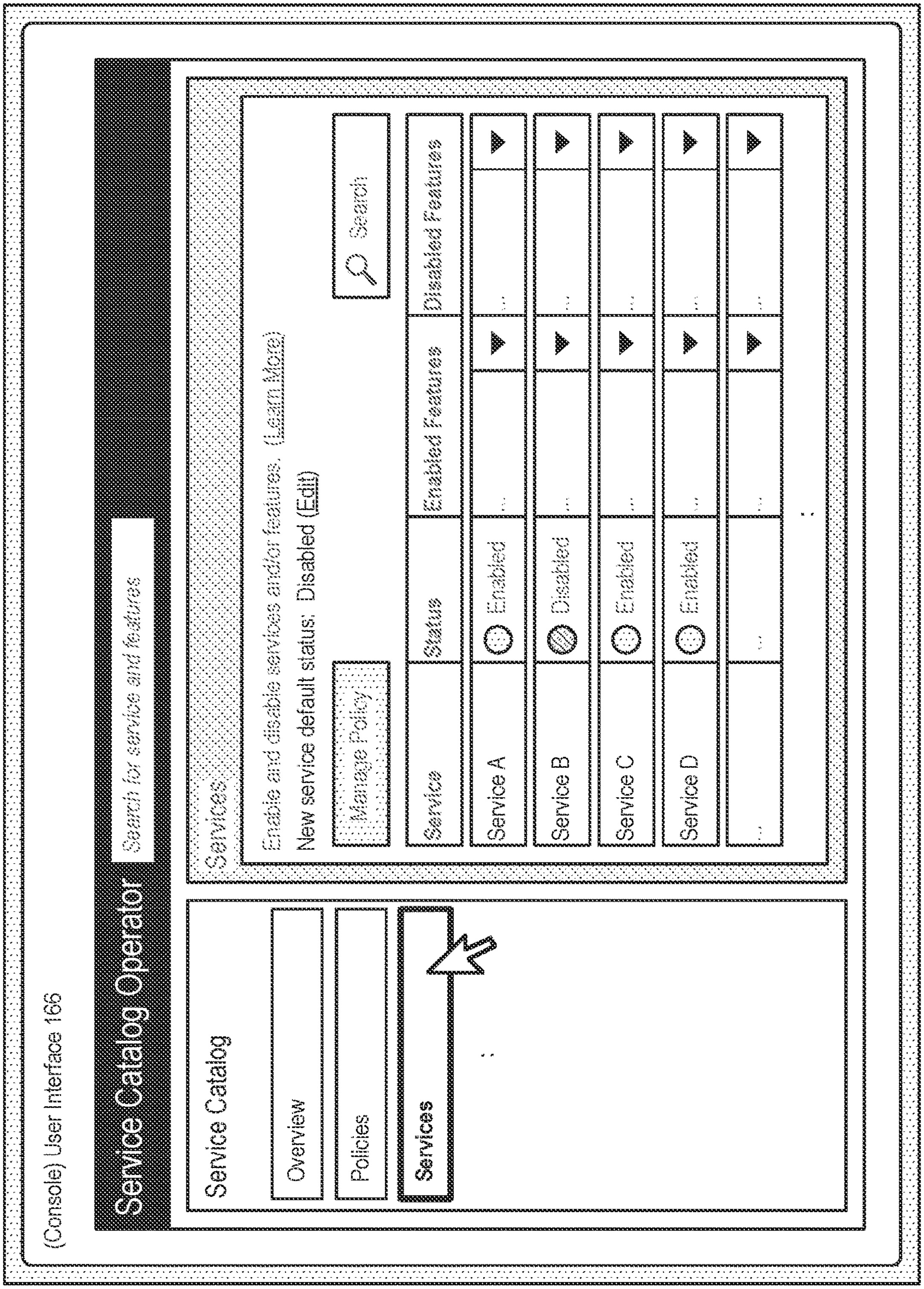
FIG. 25 illustrates an example user interface for managing the use of service control policies within a cloud infrastructure environment, in accordance with an embodiment.
Figure 26:
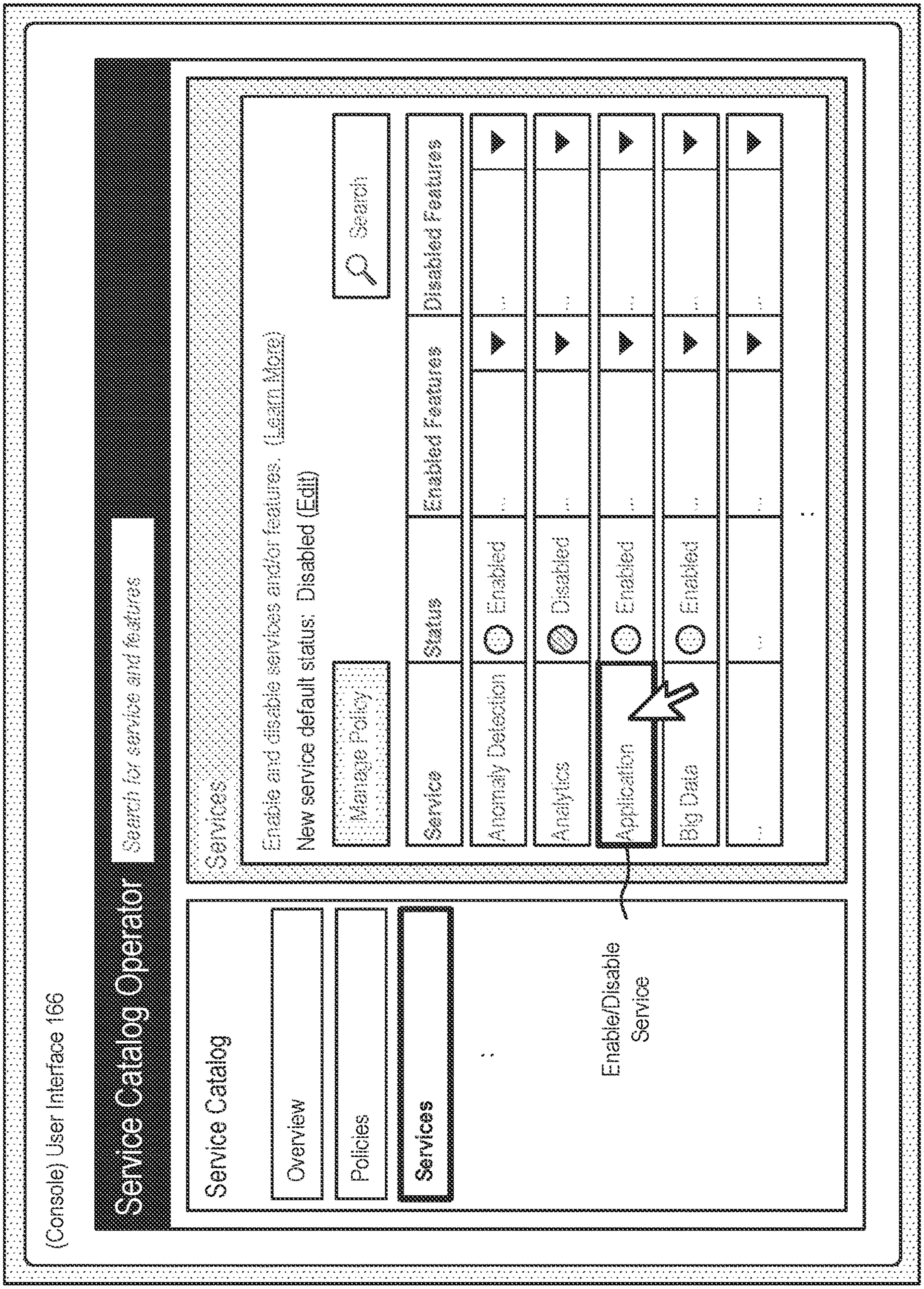
FIG. 26 further illustrates an example user interface for managing the use of service control policies within a cloud infrastructure environment, in accordance with an embodiment.
Figure 27:
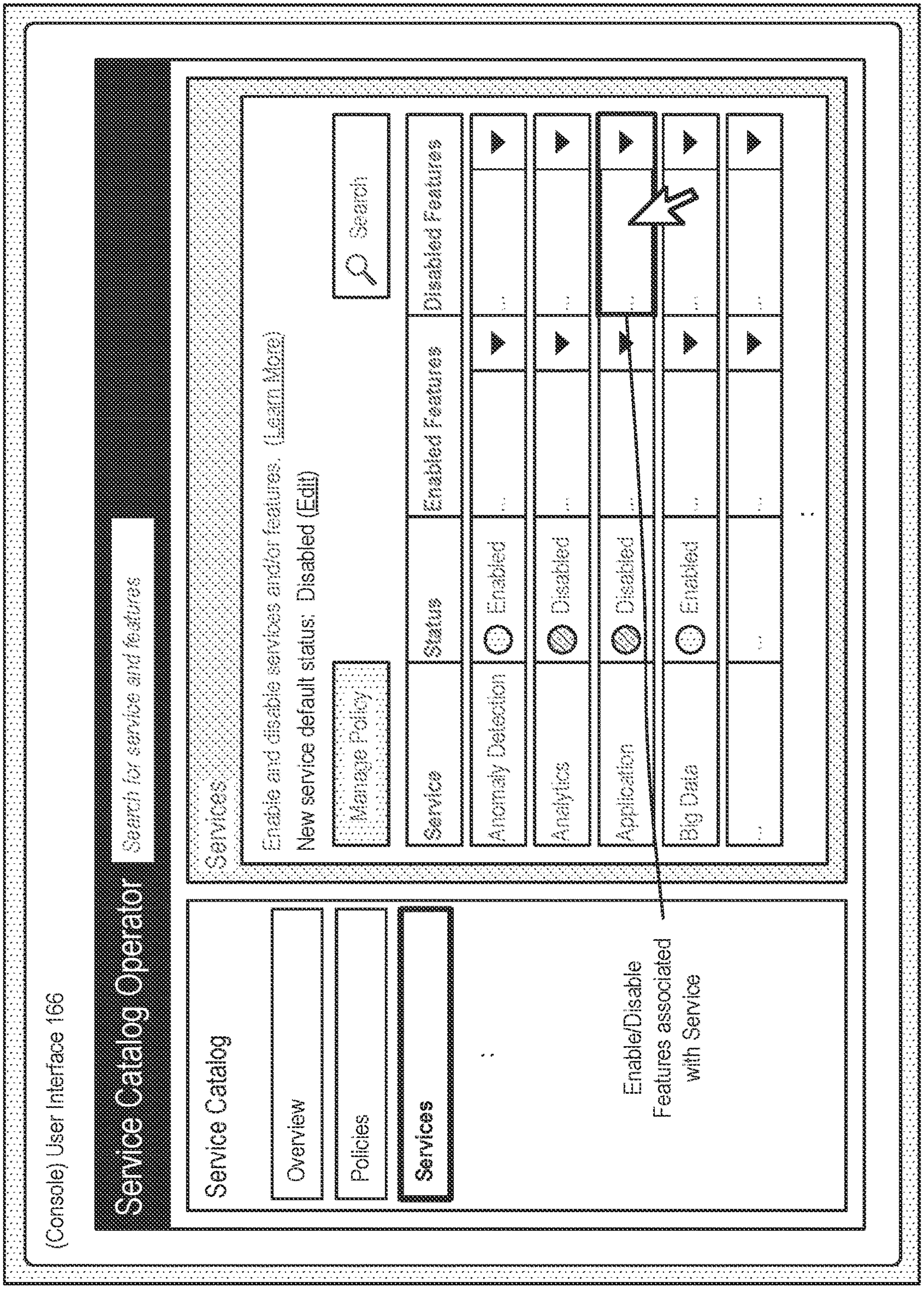
FIG. 27 further illustrates an example user interface for managing the use of service control policies within a cloud infrastructure environment, in accordance with an embodiment.

FIGS. 25-27 illustrate an example user interface for managing the use of service control policies within a cloud infrastructure environment, in accordance with an embodiment.

As illustrated in FIGS. 25-27, in accordance with an embodiment, the console user interface allows a user to manage polices, including select services, determine their status (e.g., as enabled or disabled) and enable or disable particular features associated therewith.

In accordance with an embodiment, the options available to a user (e.g., a cloud infrastructure provider operator, a realm operator, or an end user or customer) in defining availability or access to the service features will generally match the possible filtering criteria present in the policy language, for example: specific tenancy, wherein the operator should be able to see the feature state from the point-of-view of a specific tenancy; and regionality, since multiple teams will have to handle the same dimensions the console user interface can provide a unified way of handling them to make it consistent for the operators.

Service Control Policy Language

In accordance with an embodiment, the service control policies can be defined by a policy language which allows definition of (a) a service, (b) one or more service features associated with the service, and (c) one or more policies that enable or disable access to the service features. Operators (e.g., a cloud infrastructure provider, or a realm operator) can create any number of service control policies, with any number of policy statements in each policy.

In accordance with an embodiment, an example policy syntax can be expressed as:

```
enable|disable
[all| #service-name]
[feature all | #feature-name]
[where request.tenancyID =/in #tenancy_list]
[request.region =/in #region-name]
```

Wherein the various items included within a service control policy, or associated rule that implements the service control policy, can include, for example:

| Item | Details |
|---|---|
| enable \| disable | The action the rule is implementing.<br>enable—makes feature available to lower-levels.<br>disable—makes feature unavailable to lower-levels. |
| service #service-name# | The service the rule applies to. |
| feature all \| #feature-name# | The feature the rule applies to; use all to target all the features in the service. |
| where #filters# | Rule filters. |

In accordance with an embodiment, when a request to access a service or feature is processed according to a service control policy, the request context can be populated by the caller with various details such as, for example a tenant ID, or region.

The above example is provided for the purposes of illustrating the teachings herein; and is not intended to be exhaustive or to limit the scope of protection to the precise forms disclosed; in accordance with other embodiments other types of service control policy languages and syntaxes can be used to define services, service features, and service control policies associated therewith.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A method, comprising:

receiving, by a feature management service, a request to determine an availability state of a service feature of a service to a lower-level of an operator hierarchy;

identifying, by the feature management service, a set of service control policies (SCPs), wherein the set of service control policies comprises (a) a first subset of service control policies that are configured from an intermediate-level of the operator hierarchy and (b) a second subset of service control policies that are configured from a higher-level of the operator hierarchy, wherein the lower-level is directly below the intermediate-level in the operator hierarchy, and the intermediate-level is directly below the higher-level in the operator hierarchy;

determining, by the feature management service, that the first subset of service control policies are configured from the intermediate-level of the operator hierarchy that is directly above the lower-level of the operator hierarchy;

evaluating, by the feature management service, one or more of the first subset of service control policies to determine the availability state of the service feature of the service to the lower-level of the operator hierarchy; and performing one or more of:

enforcing, by the feature management service, a behavior responsive to a call made to the service feature from the lower-level of the operator hierarchy based on the availability state of the service feature to the lower-level of the operator hierarchy; or causing, by the feature management service, display or hiding of a console plugin corresponding to the service feature within a console for the lower-level of the operator hierarchy based on the availability state of the service feature to the lower-level of the operator hierarchy;

wherein the method is performed by at least one device including a hardware processor.

2. The method of claim 1, wherein:

a set of possible values for the availability state comprises available and unavailable;

the behavior responsive to the call made to the service feature from the lower-level of the operator hierarchy comprises refraining from prohibiting the call to be made if the availability state is available; and the behavior responsive to the call made to the service feature from the lower-level of the operator hierarchy comprises prohibiting the call from being made if the availability state is unavailable.

3. The method of claim 2, wherein the call made to the service feature is allowed if at least (a) the feature management service does not prohibit the call based on the availability state being available and (b) an identity service allows access to the service feature based on one or more access policies.

4. The method of claim 3, wherein at least one of the set of service control policies is directed to the service feature, and the access policies cannot be directed to any service feature of any service.

5. The method of claim 2, wherein:

the set of possible values for the availability state further comprises deprecated and retired;

the behavior responsive to the call made to the service feature from the lower-level of the operator hierarchy comprises displaying a blank indicator if the availability state is deprecated; and the behavior responsive to the call made to the service feature from the lower-level of the operator hierarchy comprises displaying a blank indicator if the availability state is retired.

6. The method of claim 1, wherein causing, by the feature management service, display or hiding of the console plugin corresponding to the service feature within the console for the lower-level of the operator hierarchy based on the availability state of the service feature to the lower-level of the operator hierarchy comprises:

transmitting the availability state of the service feature to the console, wherein the console displays or hides the console plugin based on the availability state of the service feature.

7. The method of claim 1, wherein evaluating, by the feature management service, the one or more of the first subset of service control policies to determine the availability state of the service feature of the service to the lower-level of the operator hierarchy comprises:

determining that the availability state is unavailable if at least one of the first subset of service control policies indicates disabling the service feature to the lower-level of the operator hierarchy.

8. The method of claim 1, wherein evaluating, by the feature management service, the one or more of the first subset of service control policies to determine the availability state of the service feature of the service to the lower-level of the operator hierarchy comprises:

determining that the availability state is unavailable if none of the first subset of service control policies indicates enabling the service feature to the lower-level of the operator hierarchy.

9. The method of claim 1, wherein evaluating, by the feature management service, the one or more of the first subset of service control policies to determine the availability state of the service feature of the service to the lower-level of the operator hierarchy comprises:

determining that the availability state is available if none of the first subset of service control policies indicates disabling the service feature to the lower-level of the operator hierarchy and at least one of the first subset of service control policies indicates enabling the service feature to the lower-level of the operator hierarchy.

10. The method of claim 1, wherein the service or service feature is accessed at an endpoint of an internal API gateway.

11. The method of claim 1, wherein:

the lower-level of the operator hierarchy comprises a customer;

the intermediate-level of the operator hierarchy comprises a tenant; and the higher-level of the operator hierarchy comprises a cloud service provider.

12. The method of claim 1, wherein:

the lower-level of the operator hierarchy comprises a child tenancy;

the intermediate-level of the operator hierarchy comprises a parent tenancy; and the higher-level of the operator hierarchy comprises a cloud service provider.

13. A method, comprising:

receiving, by a feature management service, a request to determine an availability state of a service feature of a service to an intermediate-level of an operator hierarchy;

identifying, by the feature management service, a set of service control policies (SCPs) that are configured from a higher-level of the operator hierarchy, wherein the intermediate-level is directly below the higher-level in the operator hierarchy;

evaluating, by the feature management service, one or more of the set of service control policies to determine the availability state of the service feature of the service to the intermediate-level of the operator hierarchy; and allowing or prohibiting, by the feature management service, one or more service control policies to be configured, from the intermediate-level of the operator hierarchy, for controlling a second availability state of the service feature to a lower-level of the operator hierarchy, based on the availability state of the service feature to the intermediate-level of the operator hierarchy, wherein the lower-level is directly below the intermediate-level in the operator hierarchy;

wherein the method is performed by at least one device including a hardware processor.

14. The method of claim 13 comprising:

wherein the availability state of the service feature to the higher-level of the operator hierarchy is available;

wherein the feature management service allows one or more control policies (SCPs) to be configured for the service feature from the intermediate-level of the operator hierarchy for the lower-level of the operator hierarchy;

further comprising:

receiving, by the feature management service, configuration of a second set of one or more service control policies from the intermediate-level of the operator hierarchy for the lower-level of the operator hierarchy;

evaluating, by the feature management service, one or more of the second set of service control policies to determine a second availability state of the service feature of the service to the lower-level of operator hierarchy; and enforcing, by the feature management service, a behavior responsive to a call made to the service feature from the lower-level of the operator hierarchy based on the second availability state of the service feature to the lower-level of the operator hierarchy.

15. The method of claim 13, wherein the service control policies are defined by a policy language which allows definition of (a) a service, (b) one or more service features associated with the service, and (c) one or more policies that enable or disable access to the service features.

16. The method of claim 13, wherein the feature management service determines in real time the state associated with the service feature based on the service control policies associated with the service, and an indication of a requesting operator or user.

17. The method of claim 13, wherein the service control policies are managed within a hierarchy of entities defining the service control policies arranged as multiple levels, wherein at each level within the hierarchy of entities defining the service control policies only the service features that have been made available by a higher-level entity can be controlled.

18. The method of claim 13, wherein the feature management service determines the state associated with the service feature by assessing a hierarchy of entities defining the service control policies and relationships between the service control policies, including, within the hierarchy of entities defining the service control policies, a first or higher-level of service control policies that defines a set of service features for which availability or access can be controlled by a second or lower-level of service control policies, and wherein the second or lower-level of service control policies control access to the set of service features in response to a request to access the service features.

19. The method of claim 18, wherein the hierarchy of entities defining the service control policies includes, at the first or higher-level, one or more cloud infrastructure provider policies associated with a particular service feature, and, at the second or lower-level, one or more realm operator policies associated with the particular service feature that determine access by the operators to its tenants or users thereof.

20. The method of claim 18, wherein the hierarchy of entities defining the service control policies includes the first or higher-level of service control policies and the second or lower-level of service control policies, and wherein a service control policy provided at the first or higher-level, that defines availability or access to a particular service, allows a service control policy provided at the second or lower-level to control access to a subset of service features associated with the particular service.

21. The method of claim 20, wherein the first or higher-level of service control policies are cloud infrastructure provider policies associated with a particular service and associated service features, and the second or lower-level of service control policies are realm operator policies associated with the particular service and associated service features and are used to control access by tenants to the subset of service features.

22. The method of claim 13, wherein a management user interface or console associated with managing a service provides an adaptive user experience based on assessing the service control policy, including that console interface elements can be removed or otherwise indicated based on a feature unavailability, as determined by the service control policy.

23. The method of claim 13, wherein an operator can create and deploy a service control policy, to restrict availability of services/features defined by the service control policy across an operator realm.

24. A method, comprising:

receiving, by a feature management service, a request to determine an availability state of a service feature of a service;

identifying, by the feature management service, a set of service control policies (SCPs), wherein the set of service control policies comprises (a) a first subset of service control policies that are respectively directed to a plurality of services, and (b) a second subset of service control policies that are respectively directed to a plurality of service features, wherein the plurality of services are respectively associated with the plurality of service features;

determining, by the feature management service, that a relevant subset of the set of service control policies comprises one or more of: (a) a first service control policy (SCP) from the first subset of service control policies that is directed to the service, or (b) a second SCP from the second subset of service control policies that is directed to the service feature;

evaluating, by the feature management service, one or more of the relevant subset of service control policies to determine the availability state of the service feature of the service;

performing one or more of:

enforcing, by the feature management service, a behavior responsive to a call made to the service feature based on the availability state of the service feature; or causing, by the feature management service, display or hiding of a console plugin corresponding to the service feature within a console based on the availability state of the service feature;

wherein the method is performed by at least one device including a hardware processor.

25. The method of claim 24, wherein the service control policies are defined by a policy language which allows definition of (a) a service, (b) one or more service features associated with the service, and (c) one or more policies that enable or disable access to the service features.

26. The method of claim 24, wherein a feature management service determines in real time the state associated with the service feature based on the service control policies associated with the service, and an indication of a requesting operator or user.

27. The method of claim 24, wherein the service control policies are managed within a hierarchy of entities defining the service control policies arranged as multiple levels, wherein at each level within the hierarchy of entities defining the service control policies only the service features that have been made available by a higher-level entity can be controlled.

28. The method of claim 24, wherein a feature management service determines the state associated with the service feature by assessing a hierarchy of entities defining the service control policies and relationships between the service control policies, including, within the hierarchy of entities defining the service control policies, a first or higher-level of service control policies that defines a set of service features for which availability or access can be controlled by a second or lower-level of service control policies, and wherein the second or lower-level of service control policies control access to the set of service features in response to a request to access the service features.

29. The method of claim 28, wherein the hierarchy of entities defining the service control policies includes, at the first or higher-level, one or more cloud infrastructure provider policies associated with a particular service feature, and, at the second or lower-level, one or more realm operator policies associated with the particular service feature that determine access by the operators to its tenants or users thereof.

30. The method of claim 28, wherein the hierarchy of entities defining the service control policies includes the first or higher-level of service control policies and the second or lower-level of service control policies, and wherein a service control policy provided at the first or higher-level, that defines availability or access to a particular service, allows a service control policy provided at the second or lower-level to control access to a subset of service features associated with the particular service.

31. The method of claim 30, wherein the first or higher-level of service control policies are cloud infrastructure provider policies associated with a particular service and associated service features, and the second or lower-level of service control policies are realm operator policies associated with the particular service and associated service features and are used to control access by tenants to the subset of service features.

32. The method of claim 24, wherein a management user interface or console associated with managing a service provides an adaptive user experience based on assessing the service control policy, including that console interface elements can be removed or otherwise indicated based on a feature unavailability, as determined by the service control policy.

33. The method of claim 24, wherein an operator can create and deploy a service control policy, to restrict the availability of services/features defined by the service control policy across an operator realm.

34. One or more non-transitory computer-readable media storing program instructions that, when executed by one or more hardware processors, cause performance of operations comprising:

receiving, by a feature management service, a request to determine an availability state of a service feature of a service;

identifying, by the feature management service, a set of service control policies (SCPs), wherein the set of service control policies comprises (a) a first subset of service control policies that are respectively directed to a plurality of services, and (b) a second subset of service control policies that are respectively directed to a plurality of service features, wherein the plurality of services are respectively associated with the plurality of service features;

determining, by the feature management service, that a relevant subset of the set of service control policies comprises one or more of: (a) a first service control policy (SCP) from the first subset of service control policies that is directed to the service, or (b) a second SCP from the second subset of service control policies that is directed to the service feature;

evaluating, by the feature management service, one or more of the relevant subset of service control policies to determine the availability state of the service feature of the service; and performing one or more of:

enforcing, by the feature management service, a behavior responsive to a call made to the service feature based on the availability state of the service feature; or causing, by the feature management service, display or hiding of a console plugin corresponding to the service feature within a console based on the availability state of the service feature.

35. A system comprising:

one or more hardware processors;

one or more non-transitory computer-readable media; and program instructions stored on the one or more non-transitory computer-readable media that, when executed by the one or more hardware processors, cause the system to perform operations comprising:

receiving, by a feature management service, a request to determine an availability state of a service feature of a service;

identifying, by the feature management service, a set of service control policies (SCPs), wherein the set of service control policies comprises (a) a first subset of service control policies that are respectively directed to a plurality of services, and (b) a second subset of service control policies that are respectively directed to a plurality of service features, wherein the plurality of services are respectively associated with the plurality of service features;

determining, by the feature management service, that a relevant subset of the set of service control policies comprises one or more of: (a) a first service control policy (SCP) from the first subset of service control policies that is directed to the service, or (b) a second SCP from the second subset of service control policies that is directed to the service feature;

evaluating, by the feature management service, one or more of the relevant subset of service control policies to determine the availability state of the service feature of the service; and performing one or more of:

enforcing, by the feature management service, a behavior responsive to a call made to the service feature based on the availability state of the service feature; or causing, by the feature management service, display or hiding of a console plugin corresponding to the service feature within a console based on the availability state of the service feature.

36. One or more non-transitory computer-readable media storing program instructions that, when executed by one or more hardware processors, cause performance of operations comprising:

receiving, by a feature management service, a request to determine an availability state of a service feature of a service to a lower-level of an operator hierarchy;

identifying, by the feature management service, a set of service control policies (SCPs), wherein the set of service control policies comprises (a) a first subset of service control policies that are configured from an intermediate-level of the operator hierarchy and (b) a second subset of service control policies that are configured from a higher-level of the operator hierarchy, wherein the lower-level is directly below the intermediate-level in the operator hierarchy, and the intermediate-level is directly below the higher-level in the operator hierarchy;

determining, by the feature management service, that the first subset of service control policies are configured from the intermediate-level of the operator hierarchy that is directly above the lower-level of the operator hierarchy;

evaluating, by the feature management service, one or more of the first subset of service control policies to determine the availability state of the service feature of the service to the lower-level of the operator hierarchy; and performing one or more of:

enforcing, by the feature management service, a behavior responsive to a call made to the service feature from the lower-level of the operator hierarchy based on the availability state of the service feature to the lower-level of the operator hierarchy; or causing, by the feature management service, display or hiding of a console plugin corresponding to the service feature within a console for the lower-level of the operator hierarchy based on the availability state of the service feature to the lower-level of the operator hierarchy.

37. One or more non-transitory computer-readable media storing program instructions that, when executed by one or more hardware processors, cause performance of operations comprising:

receiving, by a feature management service, a request to determine an availability state of a service feature of a service to an intermediate-level of an operator hierarchy;

identifying, by the feature management service, a set of service control policies (SCPs) that are configured from a higher-level of the operator hierarchy, wherein the intermediate-level is directly below the higher-level in the operator hierarchy;

evaluating, by the feature management service, one or more of the set of service control policies to determine the availability state of the service feature of the service to the intermediate-level of the operator hierarchy; and allowing or prohibiting, by the feature management service, one or more service control policies to be configured, from the intermediate-level of the operator hierarchy, for controlling a second availability state of the service feature to a lower-level of the operator hierarchy, based on the availability state of the service feature to the intermediate-level of the operator hierarchy, wherein the lower-level is directly below the intermediate-level in the operator hierarchy.

* * * * *